(12) United States Patent
Yamane

(10) Patent No.: US 12,088,207 B2
(45) Date of Patent: Sep. 10, 2024

(54) POWER SUPPLY CIRCUIT

(71) Applicant: FUJI ELECTRIC CO., LTD., Kawasaki (JP)

(72) Inventor: Hiroki Yamane, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 197 days.

(21) Appl. No.: 17/894,361

(22) Filed: Aug. 24, 2022

(65) Prior Publication Data
US 2023/0124433 A1 Apr. 20, 2023

(30) Foreign Application Priority Data

Oct. 14, 2021 (JP) .................................. 2021-168737

(51) Int. Cl.
| | | |
|---|---|---|
| *H02M 3/335* | (2006.01) | |
| *H02M 1/32* | (2007.01) | |
| *H02M 1/36* | (2007.01) | |

(52) U.S. Cl.
CPC ......... *H02M 3/33523* (2013.01); *H02M 1/32* (2013.01); *H02M 1/36* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818;
(Continued)

(56) References Cited

U.S. PATENT DOCUMENTS 9,048,742 B2 *  6/2015  Fang ................. H02M 3/33523
9,065,347 B2 *  6/2015  Behagel ............ H02M 3/33523
(Continued)

FOREIGN PATENT DOCUMENTS

JP         2003-333843 A      11/2003

*Primary Examiner* — Jeffrey A Gblende
(74) *Attorney, Agent, or Firm* — Rabin & Berdo, P.C.

(57) ABSTRACT

A power supply circuit including a transformer, a transistor controlling an inductor current flowing through a primary coil of the transformer, an integrated circuit configured to switch the transistor, and a feedback circuit configured to, when a load current is smaller and larger than a predetermined value, generate a feedback voltage to cause the output voltage to reach the target level, and to lower the output voltage, respectively. The integrated circuit includes a determination circuit determining whether the transistor operates in a first or second mode, a first overload protection circuit detecting whether the load is in an overload state, based on a power supply voltage and a determination result of the determination indicating the first mode, and a switching control circuit controlling the switching of the transistor, based on the feedback voltage, a determination result of the determination circuit, and a detection result of the first overload protection circuit.

11 Claims, 15 Drawing Sheets

(58) Field of Classification Search
CPC .............. H02M 7/4826; H02M 7/4833; Y02B 70/1491
See application file for complete search history.

(56) References Cited

U.S. PATENT DOCUMENTS 9,240,727 B2 * 1/2016 Sugawara ......... H02M 3/33523
2004/0264221 A1 12/2004 Mori

* cited by examiner

|  | CHANGE FACTOR | Vfb | Vout |
|---|---|---|---|
| CV MODE | Vout RISES | Vfb DROPS | DROP |
|  | Vout DROPS | Vfb RISES | RISE |
| CC MODE | Iout>Iout_limit | Vfb DROPS | DROP |

FIG. 8

POWER SUPPLY CIRCUIT

CROSS-REFERENCE TO RELATED APPLICATION

The present application claims priority pursuant to 35 U.S.C. § 119 from Japanese patent application number 2021-168737 filed on Oct. 14, 2021, the entire disclosure of which is hereby incorporated by reference herein.

BACKGROUND

Technical Field

The present disclosure relates to a power supply circuit.

Description of the Related Art

Known are power supply circuits each configured to control a transistor, based on an inductor current and a feedback voltage according to an output voltage thereof, to thereby generate the output voltage from an input voltage thereof (for example, Japanese Patent Application Publication No. 2003-333843).

Further, some power supply circuits have a droop characteristic that the output voltage drops when the load current flowing through a load of the power supply circuit exceeds a predetermined value such that the state of the load is an overload.

However, when a power supply circuit operates such that the output voltage drops according to the droop characteristic, the inductor current flowing through the transistor decreases in general. This makes it impossible to detect that the state of the load is an overload, based on the inductor current.

SUMMARY

An aspect of an embodiment of the present disclosure is a power supply circuit configured to generate, for a load, an output voltage at a target level from an input voltage thereof, the power supply circuit comprising: a transformer including a primary coil, a secondary coil, and an auxiliary coil; a transistor configured to control an inductor current flowing through the primary coil; an integrated circuit having a first terminal configured to receive a power supply voltage based on a voltage across the auxiliary coil, and a second terminal configured to receive a feedback voltage, the integrated circuit being configured to switch the transistor, based on the feedback voltage; and a feedback circuit configured to, responsive to a load current flowing through the load being smaller than a predetermined value, generate the feedback voltage to cause the output voltage to reach the target level, and responsive to the load current being larger than the predetermined value, generate the feedback voltage to lower the output voltage, wherein the integrated circuit further includes a determination circuit configured to determine whether the transistor operates in a first mode in which the transistor is switched or a second mode in which switching of the transistor is stopped, based on the feedback voltage, a first overload protection circuit configured to detect whether the load is in an overload state, based on the power supply voltage and a determination result of the determination circuit at a time when the determination result indicates that the transistor operates in the first mode, and a switching control circuit configured to control the switching of the transistor, based on the feedback voltage, a determination result of the determination circuit, and a detection result of the first overload protection circuit, the switching control circuit stopping the switching of the transistor, in response to the first overload protection circuit detecting that the load is in the overload state.

BRIEF DESCRIPTION OF THE DRAWINGS

FIG. 8 is a diagram illustrating a relationship between change factors of a feedback voltage Vfb in a constant voltage (CV) mode or a constant current (CC) mode and an output voltage Vout.

DETAILED DESCRIPTION

At least following matters will become apparent from the descriptions of the present specification and the accompanying drawings.

EMBODIMENTS

Figure 1:
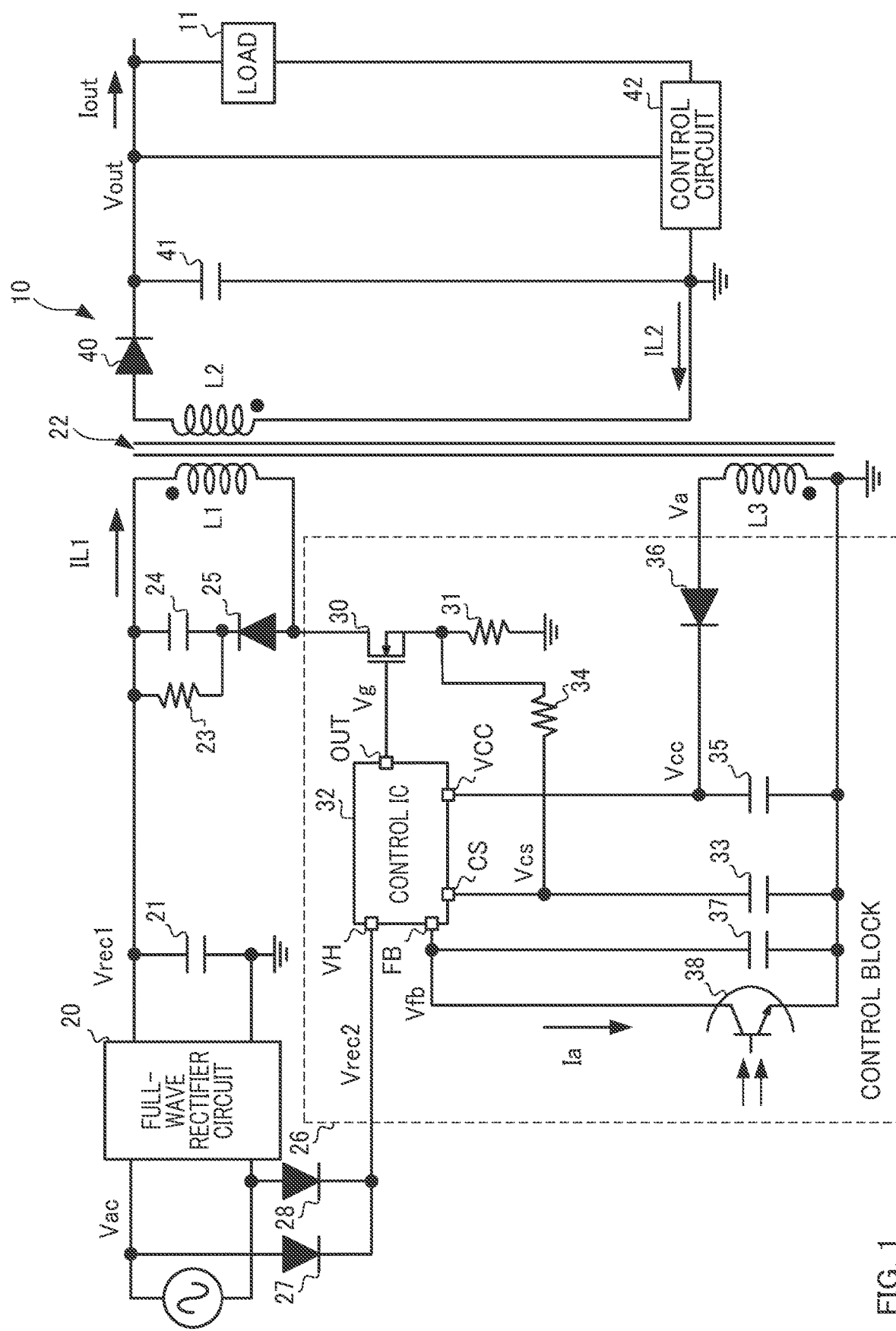
FIG. 1 is a diagram illustrating an example of the configuration of an AC-DC converter 10.

FIG. 1 is a diagram illustrating an example of the configuration of an AC-DC converter 10 according to an embodiment of the present disclosure. The AC-DC converter 10 is a power supply circuit that generates an output voltage Vout from an alternating current (AC) voltage Vac of a commercial power supply and has a droop characteristic in the output voltage Vout.

<<<Overview of AC-DC Converter 10>>>

The AC-DC converter 10 includes a full-wave rectifier circuit 20, capacitors 21, 24, and 41, a transformer 22, a resistor 23, diodes 25, 27, 28, and 40, a control block 26, and a control circuit 42. A load 11 is a load (e.g., a light-emitting diode) that is coupled to the AC-DC converter 10, to thereby receive electric power from the AC-DC converter 10, and the output voltage Vout is applied to the load 11. Note that the current flowing through the load 11 is defined as the load current Iout.

The full-wave rectifier circuit 20 full-wave rectifies a predetermined AC voltage Vac, which is an input voltage, into a voltage Vrec1, and applies the voltage Vrec1 to the primary coil L1 of the transformer 22, the capacitors 21 and 24, and the resistor 23. The capacitor 21 smooths the voltage Vrec1. Note that the AC voltage Vac is, for example, a voltage having an effective value of from 100 to 240 V and a frequency of from 50 to 60 Hz.

The transformer 22 includes the primary coil L1 provided on the input side, a secondary coil L2 magnetically coupled to the primary coil L1, and an auxiliary coil L3 magnetically coupled to the secondary coil. Here, the secondary coil L2 and the auxiliary coil L3 are wound such that the voltages generated across the secondary coil L2 and the auxiliary coil L3 are opposite in polarity to the voltage generated across the primary coil L1. The primary coil L1 and the auxiliary coil L3 are provided on the input side (primary side), and the secondary coil L2 is provided on the output side (secondary side).

The resistor 23, the capacitor 24, and the diode 25 configure a snubber circuit. The snubber circuit suppresses the surge voltage generated due to the leakage inductance of the primary coil L1 when a power transistor 30 (described later) is off, to thereby prevent breakage of the power transistor 30. The snubber circuit is coupled in parallel with the primary coil L1. The diode 25 has an anode coupled to the below-mentioned power transistor 30 on the high potential side, and a cathode coupled to the resistor 23. The capacitor 24 is coupled in parallel with the resistor 23.

The control block 26 controls the inductor current IL1 flowing through the primary coil L1 that is on the primary side with respect to the transformer 22, to thereby control the voltage generated across the secondary coil L2 that is on the secondary side with respect to the transformer 22. As a result, the output voltage Vout is generated on the secondary side with respect to the transformer 22.

The diodes 27 and 28 full-wave rectifies the AC voltage Vac, to thereby generate a rectified voltage Vrec2. The rectified voltage Vrec2 is applied to a terminal VH of a control IC 32 (described later) included in the control block 26.

The diode 40 rectifies the inductor current IL2 from the secondary coil L2 of the transformer 22, to supply the resultant current to the capacitor 41. The capacitor 41 is charged with the current from the diode 40, and thus the output voltage Vout is generated across the capacitor 41.

The control circuit 42 includes, for example, a light-emitting diode 53 (not illustrated in FIG. 1) described later, and generates a feedback voltage Vfb (described later) based on the load current Iout and the output voltage Vout, together with a phototransistor 38 (described later). Details of the control circuit 42 will be described later.

<<<Overview of Control Block 26>>>

The control block 26 is a circuit block to control the AC-DC converter 10. The control block 26 includes the power transistor 30, resistors 31 and 34, the control IC 32, capacitors 33, 35, and 37, a diode 36, and the phototransistor 38.

The power transistor 30 is an N-channel metal-oxide-semiconductor (NMOS) transistor to control the electric power supplied to the load 11, and controls the inductor current IL1 flowing through the primary coil. It is assumed in an embodiment of the present disclosure that the power transistor 30 is a metal oxide semiconductor (MOS) transistor, but the present disclosure is not limited thereto. The power transistor 30 may be, for example, a bipolar transistor or the like, as long as it is a transistor capable of controlling electric power.

The resistor 31 detects the inductor current IL1 flowing through the primary coil L1 (i.e., the current flowing through the power transistor 30) when the power transistor 30 is on. The resistor 31 has one end coupled to the source electrode of the power transistor 30, and the other end grounded.

The control IC 32 is an integrated circuit that switches the power transistor 30, to thereby generate the output voltage Vout. Specifically, the control IC 32 switches the power transistor 30, based on the inductor current IL1 and the feedback voltage Vfb.

Although details of the control IC 32 will be described later, the control IC 32 has terminals CS, FB, OUT, VCC, and VH. The power transistor 30 has a gate electrode coupled to the terminal OUT, and is switched using a drive voltage Vg. In Actuality, the control IC 32 has other terminals, but they are omitted for convenience of explanation.

The capacitor 33 is provided between the terminal CS and the ground, to thereby receive, through the resistor 34, the voltage that is generated across the resistor 31 with the inductor current IL1 flowing. The capacitor 33 and the resistor 34 configure a low-pass filter, to thereby stabilize the voltage Vcs at the terminal CS.

The capacitor 35 is provided between the terminal VCC and the ground. The diode 36 has an anode coupled to the auxiliary coil L3 and a cathode coupled to the terminal VCC.

The voltage Va generated across the auxiliary coil L3 is applied to the capacitor 35 through the diode 36. The capacitor 35 is coupled to the terminal VCC, the capacitor 35 being configured to receive the voltage that is based on the voltage Va across the auxiliary coil L3 when the power transistor 30 is off, and this voltage serves as a power supply voltage Vcc. In other words, the power supply voltage Vcc is applied to the capacitor 35.

When the output voltage Vout is maintained at a target level Vout_target, the level of the power supply voltage Vcc is maintained higher than a predetermined level Vclph described later. Note that the terminal VCC corresponds to a "first terminal", and the capacitor 35 corresponds to a "capacitor".

The capacitor 37 is provided between the terminal FB and the ground, to stabilize the voltage Vfb at the terminal FB. The voltage Vfb is the feedback voltage corresponding to the output voltage Vout and is applied to the terminal FB.

Although details will be described later, the control IC 32 turns on the power transistor 30 at the frequency corresponding to the voltage Vfb. In response to the voltage Vcs exceeding the voltage Vfb while the power transistor 30 is on, the control IC 32 turns off the power transistor 30. Note that the terminal FB corresponds to a "second terminal", and the terminal CS corresponds to a "third terminal".

The phototransistor 38 provided between the terminal FB and the ground, to receive light from the light-emitting diode 53 (described later). The higher the intensity of the light emitted by the light-emitting diode 53, the larger the sink current Ia passed by the phototransistor 38 through the terminal FB. As a result, the feedback voltage Vfb decreases, which will be described later in detail.

<<<Droop Characteristic of Output Voltage Vout Outputted from AC-DC Converter 10>>>

Although details will be described later, the AC-DC converter 10 according to an embodiment of the present disclosure supplies electric power to the load 11 (e.g., a light-emitting diode). Then, when a large amount of the load current Iout flows through the load 11 (i.e., the state of the load 11 is a heavy load), and if the AC-DC converter 10 keeps outputting the output voltage Vout at the target level Vout_target, the load 11 may be broken. In such a case, in general, the AC-DC converter 10 may cause the output voltage Vout to have a droop characteristic.

Figure 2:
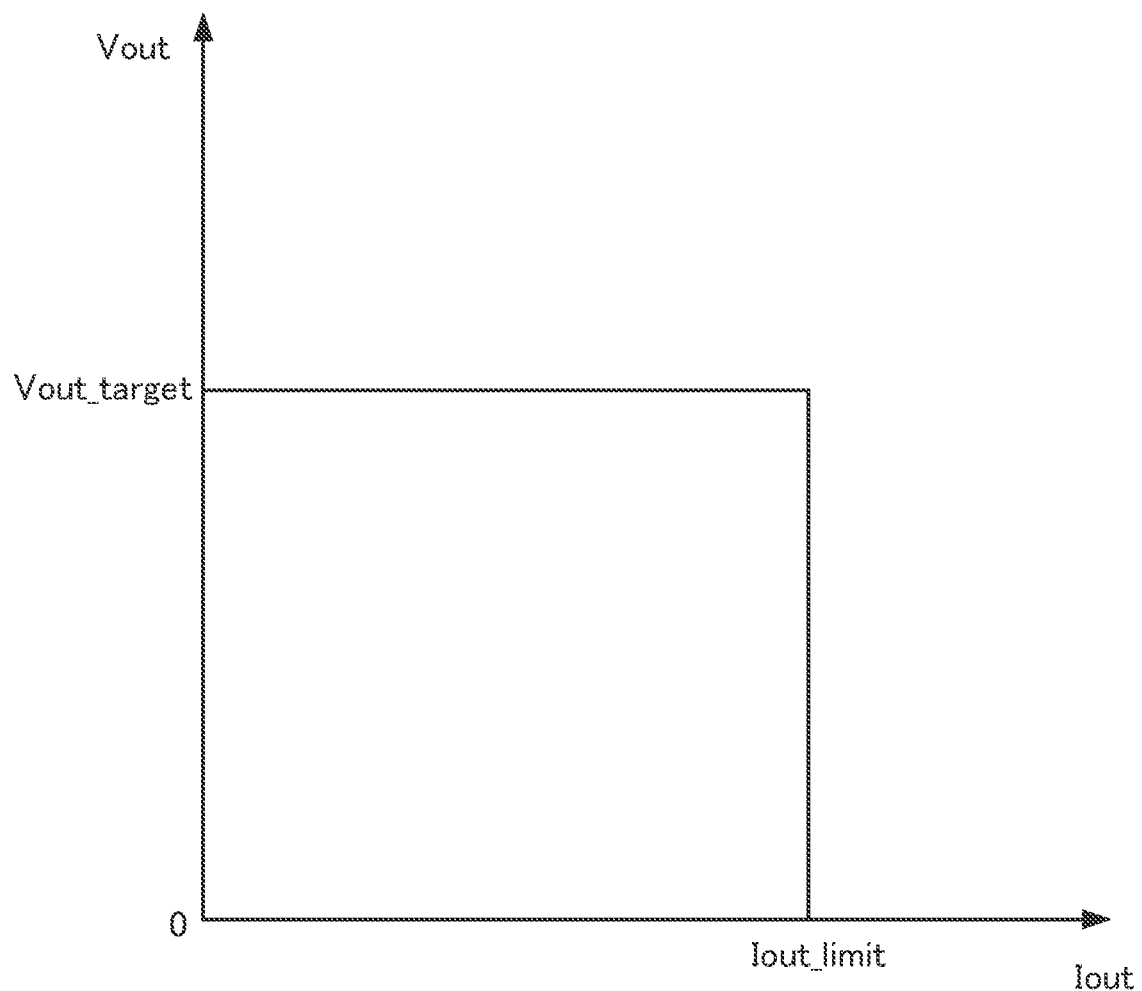
FIG. 2 is a diagram illustrating a droop characteristic of an AC-DC converter 10.

As illustrated in FIG. 2, when the load current Iout is smaller than a predetermined value Iout_limit, the AC-DC converter 10 maintains the output voltage Vout at the target level Vout_target. In this case, the AC-DC converter 10 operates in a constant voltage (CV) mode.

When the load current Iout is larger than the predetermined value Iout_limit, the AC-DC converter 10 lowers the output voltage Vout. In this case, the AC-DC converter 10 operates in a constant current (CC) mode.

<<<Overview of Control Circuit 42>>>

Figure 3:
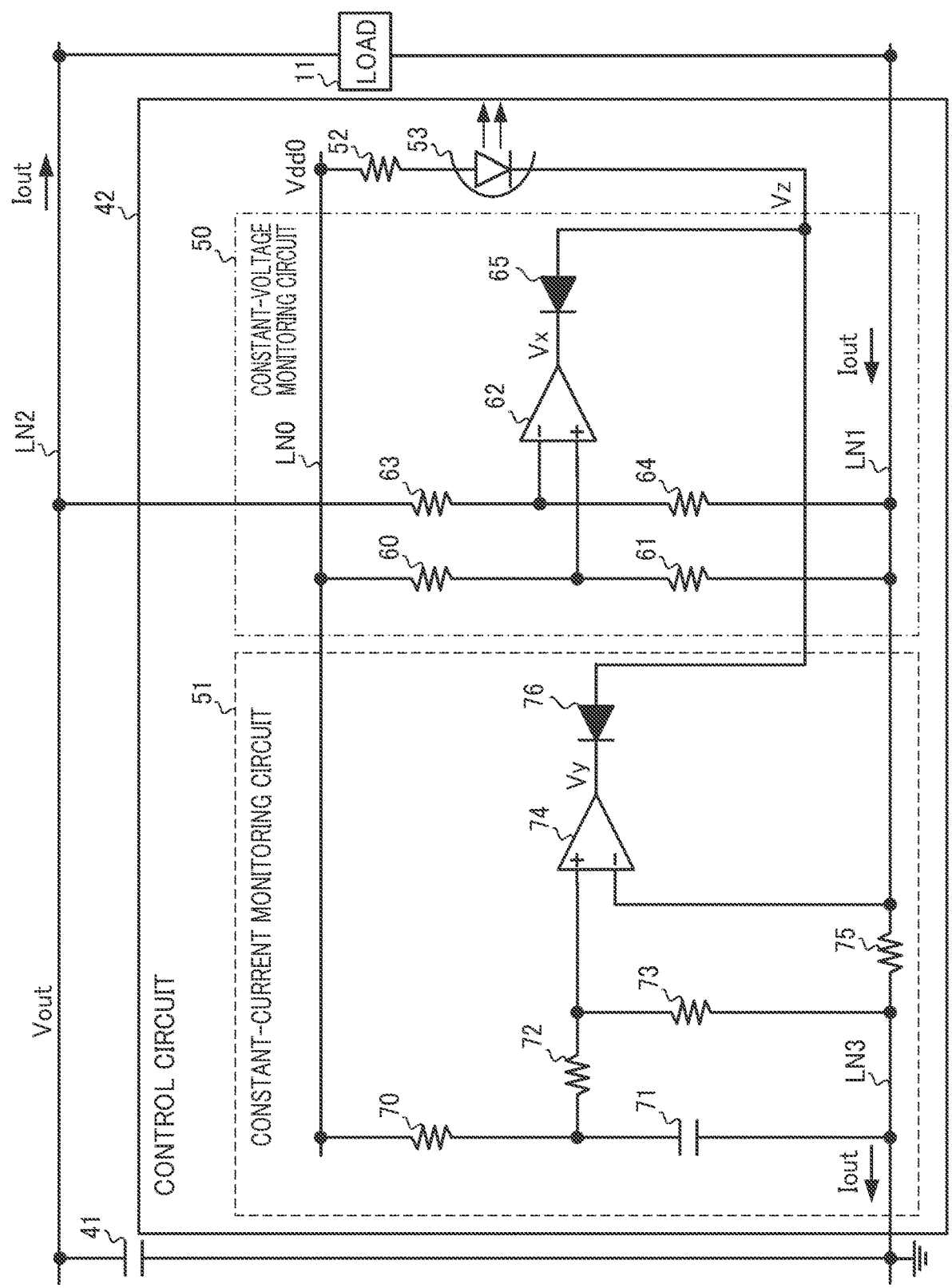
FIG. 3 is a diagram illustrating an example of the configuration of a control circuit 42.

The control circuit 42 illustrated in FIG. 3 is used to achieve such a droop characteristic as illustrated in FIG. 2. Hence, the control circuit 42 includes a constant-voltage monitoring circuit 50 that operates in the constant voltage mode and a constant-current monitoring circuit 51 that operates in the constant current mode. The configuration and operation of each of the circuits will be described below.

<<<Configuration of Control Circuit 42>>>

The following describes a specific configuration of the control circuit 42 with reference to FIG. 3. The control circuit 42 controls a photocoupler including the light-emitting diode 53 and the phototransistor 38, based on the output voltage Vout and the load current Iout.

Specifically, in the constant voltage mode, the control circuit 42 increases the intensity of the light emitted by the light-emitting diode 53 higher, as the output voltage Vout rises higher. In the constant current mode, in response to the load current Iout exceeding the predetermined value Iout_limit, the control circuit 42 increases the intensity of the light emitted by the light-emitting diode 53, so as to lower the output voltage Vout.

The control circuit 42 includes the constant-voltage monitoring circuit 50, the constant-current monitoring circuit 51, a resistor 52, and the light-emitting diode 53. Although details will be described later, when the AC-DC converter 10 operates in the constant voltage mode, the control circuit 42 controls the light emitted by the light-emitting diode 53, based on the voltage Vx applied to the cathode of the light-emitting diode 53 by the constant-voltage monitoring circuit 50.

When the AC-DC converter 10 operates in the constant current mode, the control circuit 42 controls the light emitted by the light-emitting diode 53 based on the voltage Vy applied to the cathode of the light-emitting diode 53 by the constant-current monitoring circuit 51. Further, the voltage Vz is determined according to the smaller one of the voltages Vx and Vy, where Vz is the voltage at the cathode of the light-emitting diode 53.

==Constant-Voltage Monitoring Circuit 50==

When the AC-DC converter 10 operates in the constant voltage mode, the constant-voltage monitoring circuit 50 controls the light emitted by the light-emitting diode 53 such that the output voltage Vout is at the target level Vout_target.

The constant-voltage monitoring circuit 50 includes resistors 60, 61, 63, and 64, an operational amplifier 62, and a diode 65. The resistors 60 and 61 configure a voltage divider circuit and are coupled in series between a line LN0 that receives a voltage Vdd0 supplied from a power supply (not illustrated) and a line LN1 that receives the voltage of the load 11 on the low potential side. The voltage at the coupling point between the resistors 60 and 61 is applied to the non-inverting input terminal of the operational amplifier 62.

The resistors 63 and 64 configure a voltage divider circuit and are coupled in series between a line LN2 that receives the output voltage Vout and the line LN1. The voltage at the coupling point between the resistors 63 and 64 is applied to the inverting input terminal of the operational amplifier 62.

The diode 65 has a cathode coupled to the output of the operational amplifier 62, and an anode coupled to the cathode of the light-emitting diode 53.

The operation of the constant-voltage monitoring circuit 50 configured as such will be briefly described below. For example, when the state of the load 11 becomes a light load, to thereby raise the output voltage Vout, the voltage at the coupling point between the resistors 63 and 64 rises above the voltage at the coupling point between the resistors 60 and 61. Accordingly, the operational amplifier 62 outputs a negative voltage Vx.

Note that the phrase "the state of the load 11 is a light load" refers to, for example, a case where the current value of the load current Iout flowing through the load 11 is smaller than a predetermined value (e.g., 1 A). Meanwhile, the phrase "the state of the load 11 is a heavy load" refers to, for example, a case where the current value of the load current Iout flowing through the load 11 is larger than a predetermined value (e.g., 1 A). The predetermined value (e.g., 1 A) in this case is smaller than the predetermined value Iout_limit.

The phrase "the state of the load 11 is no load" refers to a case where the current value of the load current Iout flowing through the load 11 is extremely small or 0 (zero) A. It has been described that the current value of the load current Iout to determine whether the state of the load 11 is a heavy load or a light load is, for example, 1 A, however, this current value may be set to various values.

When the voltage Vx drops lower than the voltage Vz by an amount corresponding to the forward voltage of the diode 65, then the voltage Vz drops with a further drop in the voltage Vx.

Meanwhile, for example, when the state of the load 11 becomes a heavy load, to thereby lower the output voltage Vout, the voltage at the coupling point between the resistors 63 and 64 drops below the voltage at the coupling point between the resistors 60 and 61. As a result, the operational amplifier 62 outputs a positive voltage Vx.

When the AC-DC converter 10 operates in the constant voltage mode, and the constant-voltage monitoring circuit 50 operates as described above, the light from the light-emitting diode 53 changes with the output voltage Vout, and the feedback voltage Vfb also changes therewith. Then, with the feedback voltage Vfb changing with the output voltage Vout, the AC-DC converter 10 can maintain the output voltage Vout at the target level Vout_target, which will be described later in detail.

==Constant-Current Monitoring Circuit 51==

In response to the load current Iout becoming larger than the predetermined value Iout_limit when the AC-DC converter 10 operates in the constant current mode, the constant-current monitoring circuit 51 increases the intensity of the light emitted by the light-emitting diode 53, so as to maintain the load current Iout at the predetermined value Iout_limit and lower the output voltage Vout.

The constant-current monitoring circuit 51 includes resistors 70, 72, 73, and 75, a capacitor 71, an operational amplifier 74, and a diode 76.

The resistor 70 has one end coupled to the line LN0 and the other end coupled to one end of the capacitor 71. The other end of the capacitor 71 is coupled to a line LN3 that receives the ground voltage.

The resistors 72 and 73 configure a voltage divider circuit, and are coupled between the line LN3 and the coupling point between the resistor 70 and the capacitor 71. The voltage at the coupling point between the resistors 72 and 73 is applied to the non-inverting input terminal of the operational amplifier 74. The resistor 75 is coupled between the line LN1 and the line LN3.

The inverting input terminal of the operational amplifier 74 is coupled to the line LN1. The diode 76 has a cathode coupled to the output of the operational amplifier 74 and an anode coupled to the cathode of the light-emitting diode 53.

The operation of the constant-current monitoring circuit 51 that is configured as such will be briefly described below. In response to increase in the load current Iout, rise in the voltage across the resistor 75, and rise in the voltage at the inverting input terminal of the operational amplifier 74 higher than the voltage at the coupling point between the resistors 72 and 73, the operational amplifier 74 outputs a negative voltage Vy.

Then, when the voltage Vz is higher than the sum of the voltage Vy and the forward voltage of the diode 76, the voltage Vz drops with a further drop in the voltage Vy.

In the case where, for example, the load current Iout is smaller than the predetermined value Iout_limit, the output voltage Vout is maintained at the target level Vout_target. In this case, the voltage across the resistor 75 lowers, resulting in the voltage at the inverting input terminal of the operational amplifier 74 being lower than the voltage at the coupling point between the resistors 72 and 73. Thus, the operational amplifier 74 outputs a positive voltage Vy.

When the AC-DC converter 10 operates in the constant current mode and the constant-current monitoring circuit 51 operates as described above, the light from the light-emitting diode 53 changes with the load current Iout, and the feedback voltage Vfb also changes therewith. Then, with the feedback voltage Vfb changing with the load current Iout, the AC-DC converter 10 can maintain the load current Iout so as not to exceed the predetermined value Iout_limit, which will be described later in detail.

==Resistor 52, Light-Emitting Diode 53==

The resistor 52 is a resistor to limit the current flowing through the light-emitting diode 53, and has one end coupled to the line LN0 and the other end coupled to the anode of the light-emitting diode 53. The light-emitting diode 53 is a device that emits light having an intensity according to the voltage Vz. The light-emitting diode 53 and the phototransistor 38 configure a photocoupler.

As described above, the lower the voltage Vz, the higher the intensity of the light emitted by the light-emitting diode 53. Assuming that the forward voltages of the diodes 65 and 76 are the same, the voltage Vz is determined according to the smaller one of the voltage Vx and the voltage Vy.

Note that, in an embodiment of the present disclosure, the control circuit 42 is configured such that when the load current Iout is smaller than the predetermined value Iout_limit, the voltage Vx is lower than the voltage Vy. Accordingly, when the load current Iout is smaller than the predetermined value Iout_limit, the control circuit 42 controls the phototransistor 38 to generate the feedback voltage Vfb such that the output voltage Vout achieves the target level Vout_target.

In addition, the control circuit 42 is configured such that when the load current Iout is larger than the predetermined value Iout_limit, the voltage Vy is lower than the voltage Vx. Accordingly, when the load current Iout is larger than the predetermined value Iout_limit, the control circuit 42 controls the phototransistor 38 to generate the feedback voltage Vfb such that the output voltage Vout lowers.

As described above, the control circuit 42 controls the phototransistor 38 to generate the feedback voltage Vfb, and the control IC 32 operates based on the feedback voltage Vfb, thereby causing the AC-DC converter 10 to achieve the droop characteristic illustrated in FIG. 2. Details of the method of controlling the output voltage Vout will be described later. The control circuit 42 and the phototransistor 38 correspond to a "feedback circuit".

<<<Configuration of Control IC 32>>>

Figure 4:
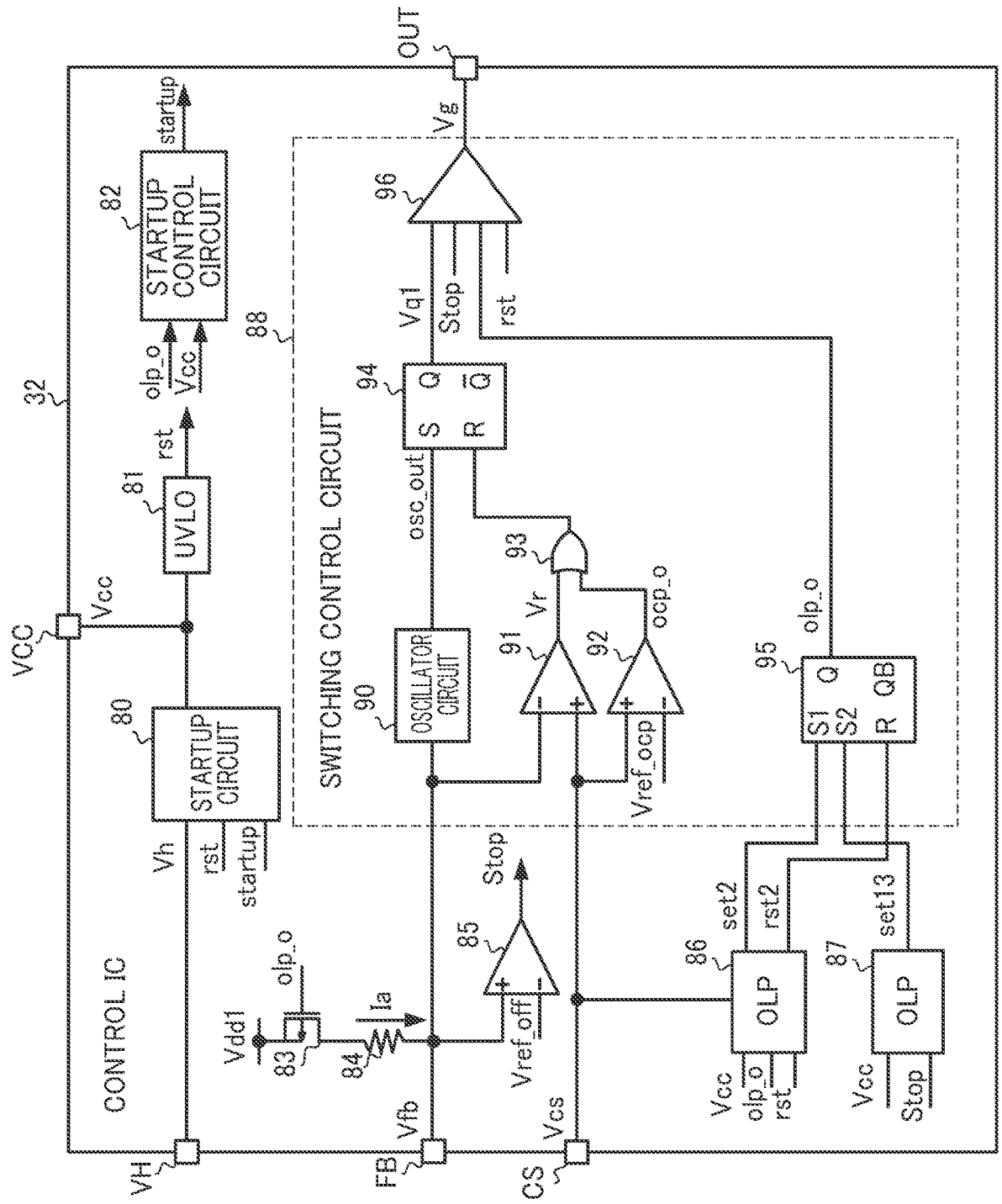
FIG. 4 is a diagram illustrating an example of the configuration of a control IC 32.

FIG. 4 is a diagram illustrating an example of the configuration of the control IC 32. The control IC 32 switches the power transistor 30, to thereby generate the output voltage Vout. Specifically, the control IC 32 switches the power transistor 30, based on the feedback voltage Vfb and the voltage Vcs corresponding to the inductor current IL1.

The control IC 32 includes a startup circuit 80, a undervoltage lockout circuit (UVLO) 81, a startup control circuit 82, a PMOS transistor 83, a resistor 84, a comparator 85, overload protection circuits (OLPs) 86 and 87, and a switching control circuit 88.

==Startup Circuit 80==

For example, when the undervoltage lockout circuit 81 (described later) outputs a signal rst at a high level (hereinafter referred to as high or high level) to reset the control IC 32, the startup circuit 80 outputs a current to charge the capacitor 35 in FIG. 1 through the terminal VCC, based on a voltage Vh applied to the terminal VH (i.e., the rectified voltage Vrec2).

Note that the phrase "resetting the control IC 32" refers to stopping the operation of the control IC (in this case, switching) in response to the high signal rst, so as to prevent the control IC 32 form malfunctioning, when the level of the power supply voltage Vcc is lower than a predetermined level Voff.

Specifically, when the level of the voltage Vcc becomes lower than the predetermined level Voff (e.g., at the startup of the control IC 32), the undervoltage lockout circuit 81 outputs the high reset signal rst, which will be described later in detail. In this case, the startup circuit 80 outputs a current in response to the high reset signal rst. Further, the startup circuit 80 outputs a current in response to a high signal startup from the startup control circuit 82 (described later).

Figure 5:
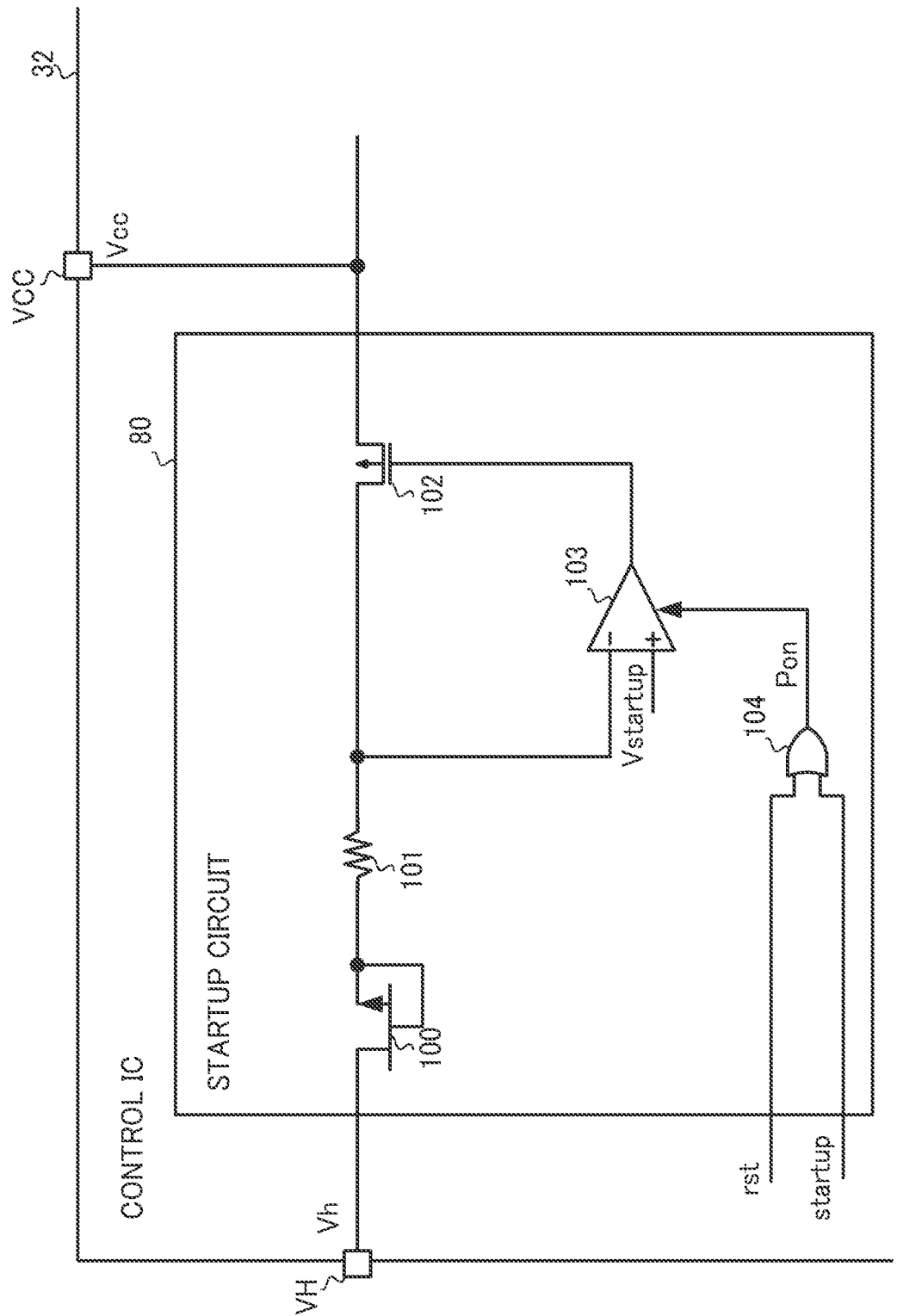
FIG. 5 is a diagram illustrating an example of the configuration of a startup circuit 80.

The startup circuit 80, as illustrated in FIG. 5, includes a J-FET 100, a resistor 101, a PMOS transistor 102, an operational amplifier 103, and an OR element 104.

The J-FET 100 has a gate electrode and a source electrode coupled to each other, and operates like a diode, to pass a current according to the voltage Vh. The resistor 101 limits the current from the J-FET 100.

The PMOS transistor 102 is provided between the resistor 101 and the terminal VCC, and changes the on-resistance according to the output voltage of the operational amplifier 103.

The operational amplifier 103 has an inverting input terminal to receive the voltage at the coupling point between the resistor 101 and the PMOS transistor 102, and a non-inverting input terminal to receive a reference voltage Vstartup. In response to the signal from the OR element 104 being high, the operational amplifier 103 is turned on, and in response to the signal from the OR element 104 being at a low level (hereinafter referred to as low or low level), the operational amplifier 103 is turned off. The OR element 104 outputs a signal in response to the signal rst and the signal startup.

Upon being turned on, the operational amplifier 103 changes the on-resistance of the PMOS transistor 102 such that the voltage at the coupling point between the resistor 101 and the PMOS transistor 102 reaches the reference voltage Vstartup. In this case, the startup circuit 80 outputs a current to charge the capacitor 35 through the terminal VCC.

Meanwhile, upon turning off of the operational amplifier 103, the PMOS transistor 102 is turned off. Thus, when the operational amplifier 103 is turned off, a current from the J-FET 100 is not outputted from the startup circuit 80. Note that the startup circuit 80 corresponds to a "charge circuit".

==Undervoltage Lockout Circuit (UVLO) 81==

Returning to FIG. 4, the undervoltage lockout circuit 81 will be described below. The undervoltage lockout circuit 81 outputs the signal rst, based on the power supply voltage Vcc. Specifically, the undervoltage lockout circuit 81 outputs the high signal rst to stop switching of the power transistor 30, in response to the level of the voltage Vcc reaching the predetermined level Voff.

Meanwhile, When the startup circuit 80 is in operation, the undervoltage lockout circuit 81 outputs the low signal rst to enable switching of the power transistor 30, in response to the level of the voltage Vcc reaching a predetermined level Von which is higher than the predetermined level Voff.

The switching control circuit 88 (described later) stops switching of the power transistor 30, upon receiving the high signal rst. Meanwhile, upon receiving the low signal rst to enable switching, the switching control circuit 88 controls switching of the power transistor 30, based on the feedback voltage Vfb and a signal Stop (described later). Further, the predetermined level Voff is lower than a predetermined level Vbml (described later).

Note that the undervoltage lockout circuit 81 corresponds to a "protection circuit", the predetermined level Voff corresponds to a "third voltage", the predetermined level Von corresponds to a "fourth voltage", the high signal rst corresponds to a "stop signal", and the low signal rst corresponds to an "enabling signal".

==Startup Control Circuit 82==

The startup control circuit 82 controls the startup circuit 80. Specifically, in response to the overload protection circuit 86 (described later) or the overload protection circuit 87 (described later) detecting an overload, and a high signal olp_o (described later) indicating an overload being received, the startup control circuit 82 outputs the signal startup, based on the voltage Vcc.

In this case, the startup control circuit 82 outputs the signal startup such that the voltage Vcc is between the predetermined level Vclph and a predetermined level Vclpl which is lower than the predetermined level Vclph. Specifically, in response to the level of the power supply voltage Vcc reaching the predetermined level Vclpl, the startup control circuit 82 outputs the high signal startup to turn on the operational amplifier 103 in FIG. 5. Accordingly, the capacitor 35 in FIG. 1 is charged by the startup circuit 80, and thus the level of the power supply voltage Vcc rises from the predetermined level Vclpl.

Meanwhile, in response to the level of the power supply voltage Vcc reaching the predetermined level Vclph, the startup control circuit 82 outputs the low signal startup to turn off the operational amplifier 103. Accordingly, as the control IC 32, which operates with the power supply voltage Vcc, consumes electric power, the level of the power supply voltage Vcc drops from the predetermined level Vclph. Note that how the predetermined levels Vclph and Vclpl are generated will be described later.

==PMOS Transistor 83==

The PMOS transistor 83 is turned off, upon receiving a high signal olp_o indicating an overload from an SR flip-flop 95 (described later), to thereby stop applying a voltage Vdd1 from an internal power supply (not illustrated) to the resistor 84.

Thus, the PMOS transistor 83 has a source electrode to receive the voltage Vdd1 and a gate electrode to receive the signal olp_o. The drain electrode of the PMOS transistor 83 is coupled to the resistor 84.

Switching of the power transistor 30 is stopped upon detection of an overload, to thereby negate the need for an oscillator circuit 90 (described later) to output an oscillator signal osc_out. In an embodiment of the present disclosure, upon detection of an overload, the PMOS transistor 83 is turned off, to thereby cause the feedback voltage Vfb to be the ground voltage. As a result, the oscillator circuit 90 decreases the frequency Fsw of the oscillator signal osc_out, which will be described later in detail. This reduces the power consumption of the control IC 32 after detection of an overload.

==Resistor 84==

The resistor 84 has one end coupled to the drain electrode of the PMOS transistor 83 and the other end coupled to the terminal FB. A sink current Ia flows through the resistor 84, and the feedback voltage Vfb is generated based on the voltage across the resistor 84.

Specifically, in response to increase in the intensity of the light from the light-emitting diode 53, the phototransistor 38 passes a large sink current Ia through the terminal FB. Thus, the voltage across the resistor 84 rises, and the feedback voltage Vfb drops.

==Comparator 85==

The comparator 85 determines whether a mode is a first mode in which the power transistor 30 is switched or a second mode in which switching of the power transistor 30 is stopped, based on the feedback voltage Vfb.

Specifically, when the level of the feedback voltage Vfb is lower than a predetermined level Vref_off, the comparator 85 outputs the low signal Stop to cause a buffer 96 (described later) to stop switching. Meanwhile, when the level of the feedback voltage Vfb is higher than the predetermined level Vref_off, the comparator 85 outputs the high signal Stop to cause the buffer 96 to perform switching. Note that the comparator 85 corresponds to a "determination circuit", and the signal Stop corresponds to a "determination result".

==Overload Protection Circuit (OLP) 86==

The overload protection circuit 86 detects whether the state of the load 11 is an overload, when the AC-DC converter 10 operates in the constant voltage mode. Specifically, in the constant voltage mode, the overload protection circuit 86 detects the state of the load 11, based on the voltage Vcs and the power supply voltage Vcc. Details of the overload protection circuit 86 will be described later.

==Overload Protection Circuit (OLP) 87==

The overload protection circuit 87 detects whether the state of the load 11 is an overload, when the AC-DC converter 10 operates in the constant current mode. Specifically, in the constant current mode, the overload protection circuit 87 detects the state of the load 11, based on the power supply voltage Vcc.

When the state of the load 11 is an overload, the overload protection circuit 87 outputs a high signal set13 indicating an overload. Details of the overload protection circuit 87 will be described later.

===Switching Control Circuit 88===

The switching control circuit 88 generates and amplifies a drive signal, to output the drive voltage Vg. Specifically, the switching control circuit 88 outputs the drive voltage Vg, based on the feedback voltage Vfb, the determination result of the comparator 85, and the signal olp_o from the SR flip-flop 95 (described later). The switching control circuit 88 amplifies a drive signal Vq1 and controls switching of the power transistor 30 with the drive voltage Vg.

The switching control circuit 88 includes the oscillator circuit 90, comparators 91 and 92, an OR element 93, SR flip-flops 94 and 95, and the buffer 96.

===Oscillator Circuit 90===

Figure 6:
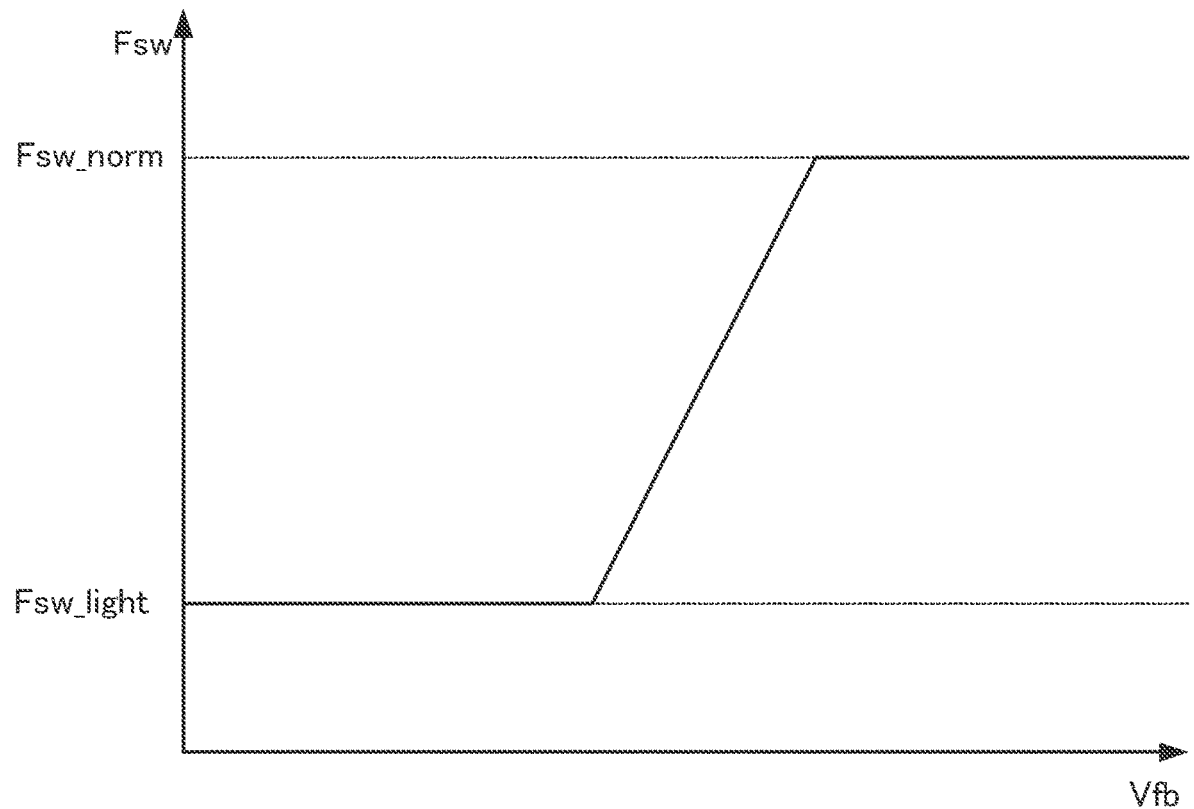
FIG. 6 is a diagram illustrating a relationship between a feedback voltage Vfb and a frequency Fsw of an oscillator signal osc_out.

The oscillator circuit 90 generates timings at which the power transistor 30 is turned on. Specifically, the oscillator circuit 90 outputs the oscillator signal osc_out, based on the feedback voltage Vfb. The frequency Fsw of the oscillator signal osc_out is set commonly to a predetermined frequency Fsw_norm (e.g., 100 kHz), and so as to decrease with a drop in the feedback voltage Vfb, as illustrated in FIG. 6, for example.

===Comparator 91===

Returning to FIG. 4, the comparator 91 generates timings at which the power transistor 30 is turned off. Specifically, when the power transistor 30 is on and the voltage Vcs reaches the feedback voltage Vfb, the comparator 91 outputs a high signal Vr to turn off the power transistor 30.

===Comparator 92===

The comparator 92 limits the inductor current IL1 flowing through the power transistor 30 such that the inductor current IL1 will not be an overcurrent. Specifically, when the voltage Vcs corresponding to the inductor current IL1 is larger than a predetermined level Vref_ocp, in other words, when the inductor current IL1 is an overcurrent, the comparator 92 outputs a high signal ocp_o to turn off the power transistor 30. When the inductor current IL1 is not an overcurrent, the comparator 92 outputs the low signal ocp_o.

===OR Element 93===

In response to the comparator 91 outputting the high signal Vr or the comparator 92 outputting the high signal ocp_o, the OR element 93 outputs a signal to turn off the power transistor 30.

===SR Flip-Flop 94===

The SR flip-flop 94 outputs the drive signal Vq1. Specifically, in response to the oscillator circuit 90 outputting the high oscillator signal osc_out to turn on the power transistor 30, the SR flip-flop 94 outputs a high signal Vq1 to turn on the power transistor 30. Meanwhile, in response to the OR element 93 outputting a high signal, the SR flip-flop 94 outputs the low signal Vq1 to turn off the power transistor 30.

<<<Description of Operation of Generating Drive Signal Vq1>>>

Figure 7:
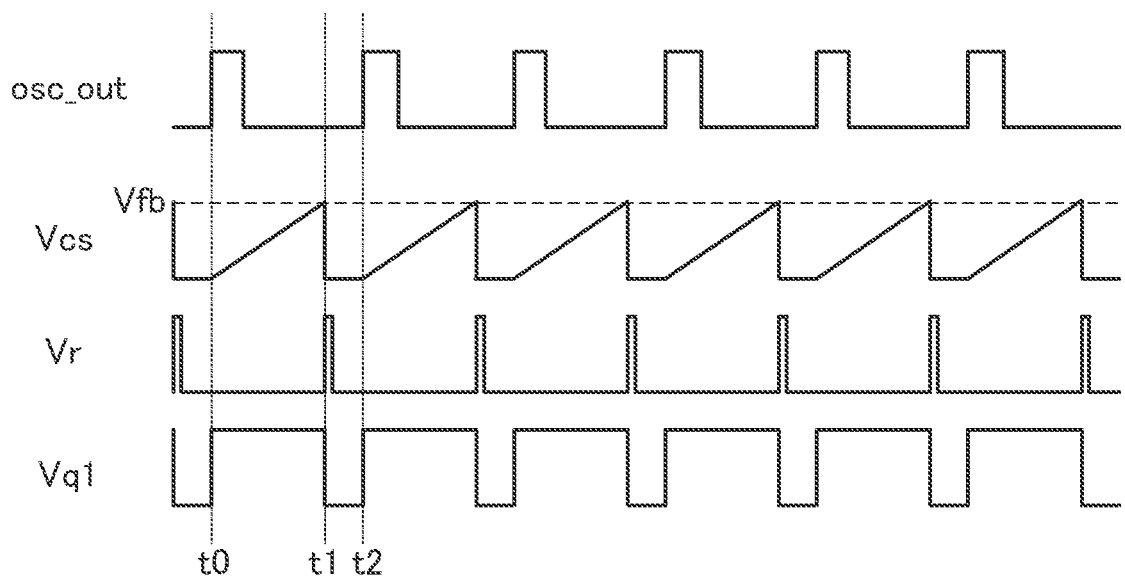
FIG. 7 is a diagram for describing an operation of generating a drive signal Vq1.

FIG. 7 is a diagram for describing an operation of generating the drive signal Vq1. With reference to FIG. 7, a description will be given of the operation in which the switching control circuit 88 generates the drive signal Vq1, when the feedback voltage Vfb is high and the frequency Fsw of the oscillator signal osc_out is at the predetermined frequency Fsw_norm.

Note that the switching control circuit 88 generates the drive signal Vq1, to control the ratio of the ON period of the power transistor 30 relative to the cycle determined by the frequency Fsw of the oscillator signal osc_out (i.e., to perform PWM control).

In response to the oscillator circuit 90 outputting the high oscillator signal osc_out at time t0, the SR flip-flop 94 outputs the high drive signal Vq1 to turn on the power transistor 30.

The comparator 91 outputs the high signal Vr at time t1 at which the voltage Vcs reaches the feedback voltage Vfb with turning on of the power transistor 30. This causes the SR flip-flop 94 to output the low drive signal Vq1 to turn off the power transistor 30. In response to this low drive signal Vq1, the current flowing through the power transistor 30 reaches zero, and thus the voltage Vcs also reaches the ground voltage.

At time t2 at which a time period corresponding to the cycle of the predetermined frequency Fsw_norm has elapsed since time t0, the oscillator circuit 90 outputs the high oscillator signal osc_out again. Thereafter, the same or a similar operation continues.

Returning to FIG. 4, the SR flip-flop 95 and the buffer 96 of the switching control circuit 88 will be described.

===SR Flip-Flop 95===

The SR flip-flop 95 outputs the signal olp_o in response to the signals from the overload protection circuits 86 and 87. In response to the overload protection circuit 86 outputting a high signal set2 indicating an overload, or the overload protection circuit 87 outputting a high signal set13, the SR flip-flop 95 outputs the high signal olp_o. In response to the overload protection circuit 86 outputting a high signal rst2 to reset the high signal olp_o, the SR flip-flop 95 outputs the low signal olp_o.

===Buffer 96===

When the high signal rst or the high signal olp_o is not outputted, the buffer 96 amplifies the drive signal Vq1, to output the drive voltage Vg through the terminal OUT.

Specifically, when the high signal rst is outputted, the buffer 96 outputs the drive voltage Vg at the ground voltage, resulting in stopping switching of the power transistor 30.

Also upon receiving the high signal olp_o, the buffer 96 stops switching the power transistor 30, as in the case of the signal rst. Meanwhile, when neither of the above signals is outputted, the buffer 96 switches the power transistor 30 in response to the drive signal Vq1 and the signal Stop.

<<<Relationship Between Change Factors of Feedback Voltage Vfb and Output Voltage Vout>>>

As has been described above, the relationship between the change factors of the feedback voltage Vfb and the output voltage Vout varies depending on whether the AC-DC converter 10 operates in the constant voltage mode or the constant current mode, as illustrated in FIG. 8.

Specifically, when the AC-DC converter 10 operates in the constant voltage mode, the voltage Vx of the constant-voltage monitoring circuit 50 in FIG. 3 is lower than the voltage Vy of the constant-current monitoring circuit 51.

In this case, in response to the output voltage Vout rises higher than the target level Vout_target according to a change in the state of the load 11, the voltage Vx drops. Then, in association therewith, the voltage Vz drops, and thus the intensity of the light from the light-emitting diode 53 increases, and the sink current Ia of the phototransistor 38 increases. As a result, the feedback voltage Vfb drops as illustrated in FIG. 8.

When the feedback voltage Vfb drops, the oscillator circuit 90 in FIG. 4 outputs the oscillator signal osc_out with a frequency Fsw_light. In this case, the control IC 32 decreases the switching frequency and switches the power transistor 30 as in the time period from time t10 to t12 in FIG. 9.

Figure 9:
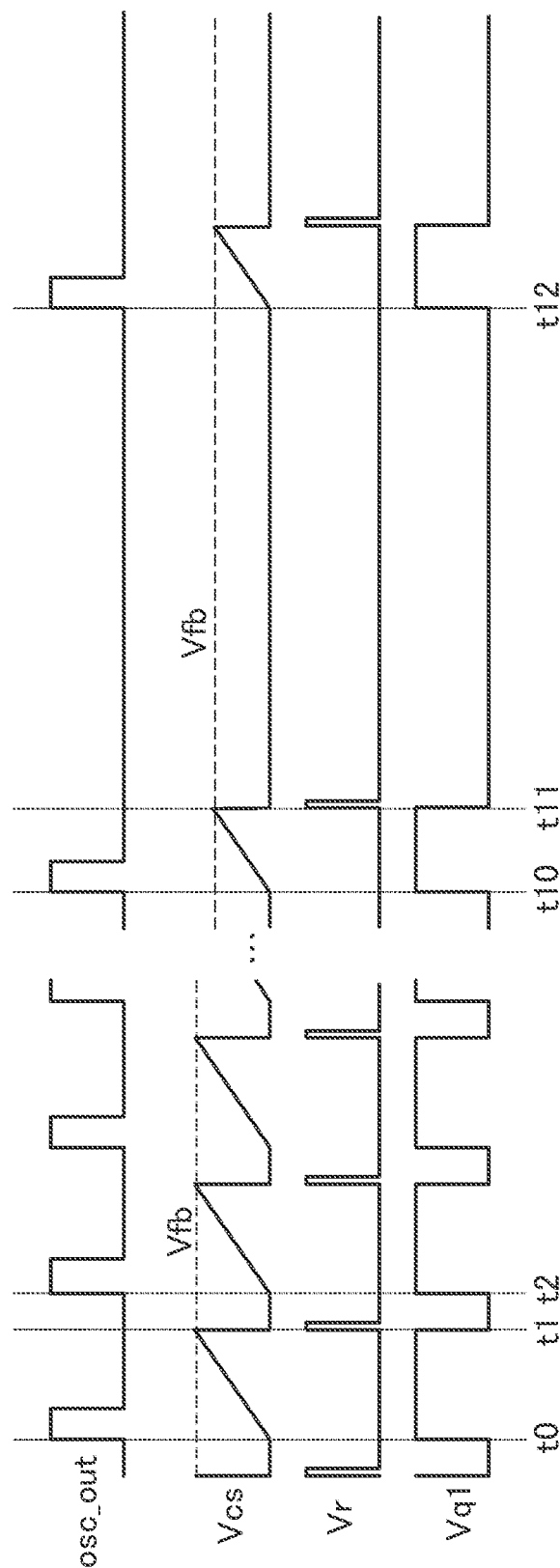
FIG. 9 is a diagram illustrating an example of the waveform of a drive signal Vq1 when a feedback voltage Vfb drops.

As a result, the time period during which the inductor current IL1 flows decreases relative to the cycle during which the power transistor 30 is on, the inductor current IL2 flowing through the secondary coil L2 also decreases, and the output voltage Vout drops. In this case, the ON period of the power transistor 30 decreases shorter than that when the voltage Vfb is high, as illustrated in FIG. 9.

When the output voltage Vout drops lower than the target level Vout_target, the feedback voltage Vfb rises, and the control IC 32 extends the ON period of the power transistor 30. As a result, the inductor current IL1 increases, and thus the inductor current IL2 flowing through the secondary coil L2 also increases.

As a result, the output voltage Vout rises. This maintains the output voltage Vout at the target level Vout_target, when the AC-DC converter 10 operates in the constant voltage mode.

Meanwhile, when the AC-DC converter 10 operates in the constant current mode, the voltage Vy of the constant-current monitoring circuit 51 in FIG. 3 is lower than the voltage Vx.

In this case, in response to the load current Iout increasing higher than the predetermined value Iout_limit, the voltage Vy drops. Then, in association therewith, the voltage Vz drops, and thus the intensity of the light from the light-emitting diode 53 increases, resulting in a drop in the feedback voltage Vfb, as described above and illustrated in FIG. 8.

In response to drop in the feedback voltage Vfb, the output voltage Vout drops as described above. Then, in response to drop in the output voltage Vout, the load current Iout decreases. Accordingly, the AC-DC converter 10 has a droop characteristic as illustrated in FIG. 2.

Although details will be described after the configuration and operation of the overload protection circuit 86 are described, when the AC-DC converter 10 is operating in the constant current mode, the overload protection circuit 86 cannot detect that the state of the load 11 is an overload. To address this, the control IC 32 according to an embodiment of the present disclosure includes the overload protection circuit 87.

Note that in response to the load current Iout decreasing lower than the predetermined value Iout_limit, the voltage Vx drops lower than the voltage Vy, and the AC-DC converter 10 operates in the constant voltage mode.

<<<Two Overload Protection Circuits (OLPs) 86 and 87>>>

Figure 10:
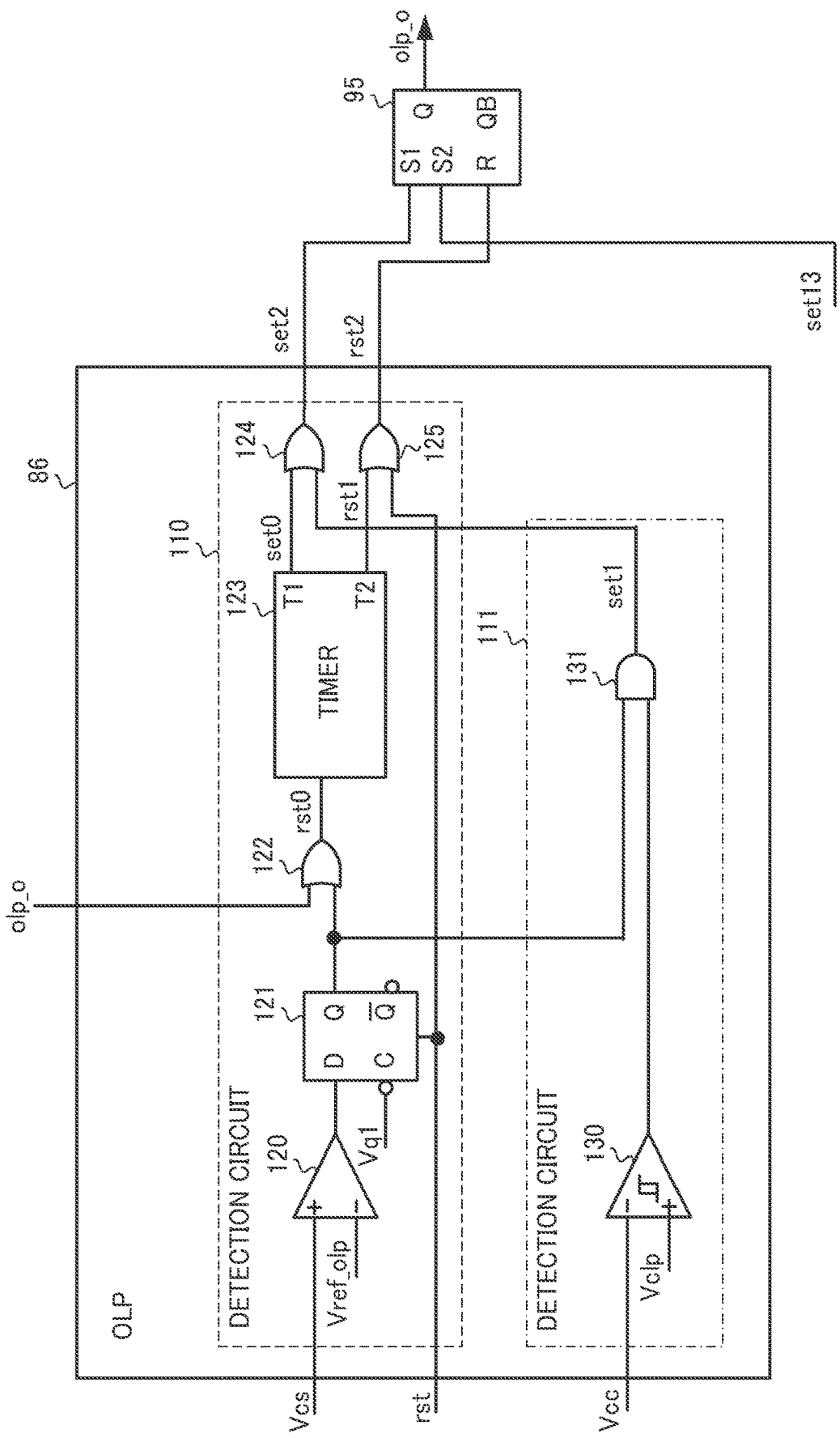
FIG. 10 is a diagram illustrating an example of the configuration of an overload protection circuit 86.
Figure 11:
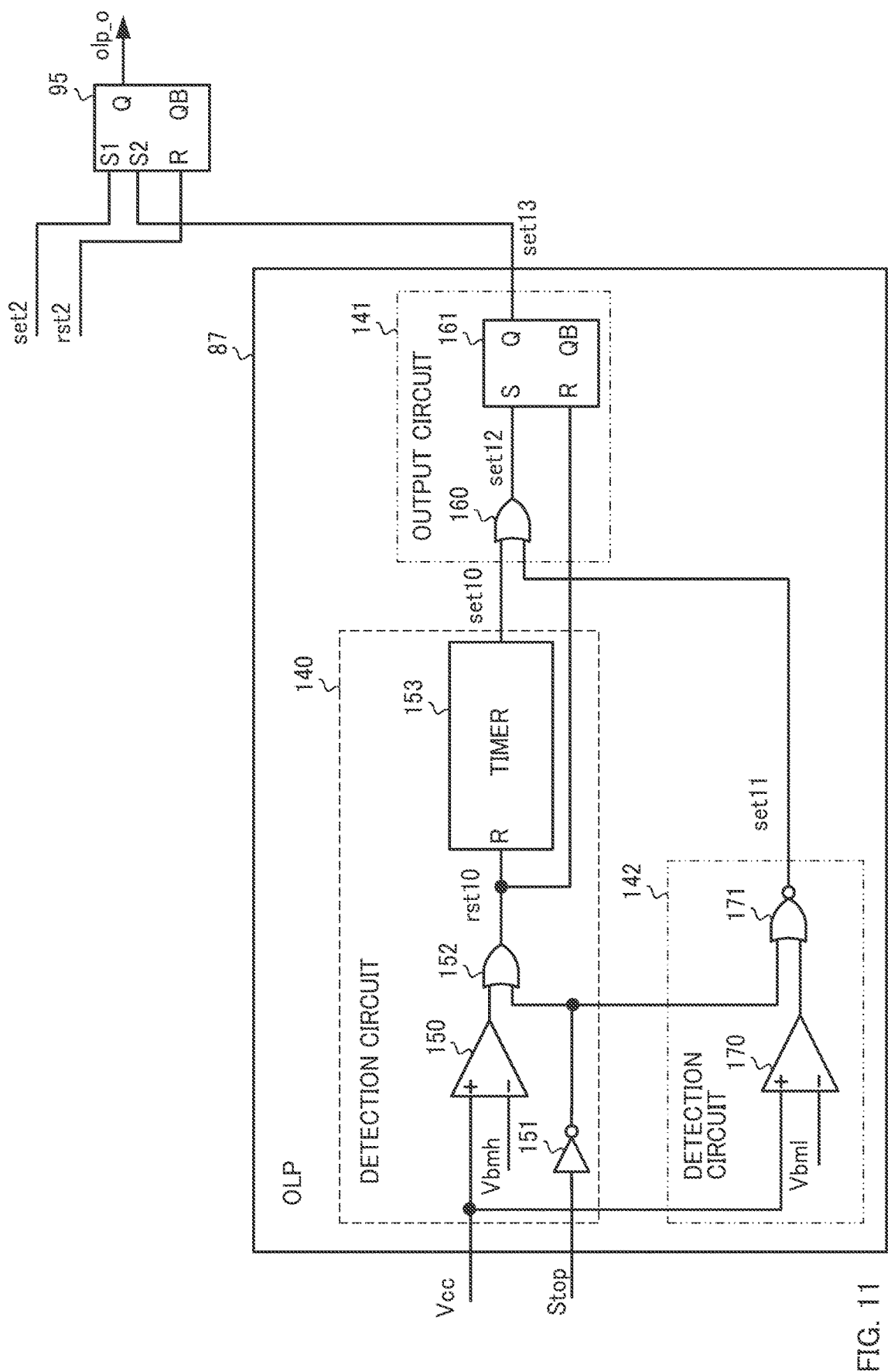
FIG. 11 is a diagram illustrating an example of the configuration of an overload protection circuit 87.

The following describes details of the configurations of the overload protection circuits 86 and 87 with reference to FIGS. 10 and 11.

==Overload Protection Circuit (OLP) 86==

As described above, when the AC-DC converter 10 is operating in the constant voltage mode, the overload protection circuit 86 detects whether the state of the load 11 is an overload. Specifically, in the constant voltage mode, the overload protection circuit 86 detects the state of the load 11, based on the voltage Vcs and the power supply voltage Vcc.

The overload protection circuit 86 includes detection circuits 110 and 111, as illustrated in FIG. 10.

===Detection Circuit 110===

The detection circuit 110 outputs the signal set2 indicating whether the state of the load 11 is an overload, based on the voltage Vcs. Here, the time period during which the state of the load 11 is an overload, in other words, the time period during which the level of the voltage Vcs upon turning off of the power transistor 30 is higher than a predetermined level Vref_olp is defined as the time period P0.

Specifically, in response to the time period P0 continuing for a predetermined time period T1, the detection circuit 110 outputs the high signal set2. In this case, the switching control circuit 88 in FIG. 4 stops switching of the power transistor 30 in response to the high signal set2.

The detection circuit 110 includes a comparator 120, a D flip-flop 121, OR elements 122, 124, and 125, and a timer 123.

====Comparator 120====

The comparator 120 determines whether the state of the load 11 is an overload, based on the level of the voltage Vcs. Specifically, the comparator 120 compares the level of the voltage Vcs with the predetermined level Vref_olp.

====D Flip-Flop 121====

The D flip-flop 121 indicates the time period P0 during which the state of the load 11 is an overload. Specifically, when the level of the voltage Vcs is higher than the predetermined level Vref_olp upon turning off of the power transistor 30, the D flip-flop 121 outputs a high signal. In other words, the D flip-flop 121 outputs the high signal for the time period P0 during which the state of the load 11 is an overload.

Meanwhile, when the comparator 120 indicates that the level of the voltage Vcs is smaller than the predetermined level Vref_olp upon turning off of the power transistor 30, the D flip-flop 121 outputs a low signal. Note that when the undervoltage lockout circuit 81 outputs the high signal rst, the D flip-flop 121 is reset.

====OR Element 122====

The OR element 122 generates a signal rst0 to reset the timer 123. Specifically, in response to the D flip-flop 121 outputting a high signal, the OR element 122 outputs the high signal rst0 to release the reset of the timer 123.

Further, in response to the SR flip-flop 95 outputting the high signal olp_o, the OR element 122 outputs the high signal rst0.

====Timer 123====

In response to release of the reset of the timer 123, the timer 123 performs time measurement to determine whether the time period P0 reaches the predetermined time period T1 and, at the same time, measures a time period T2. Specifically, in response to the OR element 122 outputting the high signal rst0, the timer 123 starts time measurement of the time periods T1 and T2.

In response to the time period P0 reaching the predetermined time period T1, the timer 123 outputs a high signal set0 indicating an overload.

Meanwhile, in response to the timer 123 receiving the low signal rst0 to reset the timer 123 before the time period P0 reaches the predetermined time period T1, the timer 123 outputs the low signal set0.

Further, in response to the timer 123 having measured the predetermined time period T2 since the start of the time measurement of the time period P0, the timer 123 outputs a high signal rst1 to cause the SR flip-flop 95 to reset the high signal olp_o. In this case, the switching control circuit 88 in FIG. 4 controls switching of the power transistor 30, based on the feedback voltage Vfb and the signal Stop.

Note that the overload protection circuit 86 corresponds to a "second overload protection circuit", the timer 123 corresponds to a "second timer circuit" and a "third timer circuit", the predetermined time period T1 corresponds to a "third time period", and the predetermined time period T2 corresponds to a "second time period" and a "fourth time period".

The detection circuit 110 corresponds to a "third detection circuit", and the signal set2 corresponds to a "third detection signal".

====OR Elements 124 and 125====

In response to the timer 123 outputting the high signal set0, or the detection circuit 111 (described later) outputting a high signal set1 indicating an overload, the OR element 124 outputs the high signal set2.

In response to the timer 123 outputting the high signal rst1, or the undervoltage lockout circuit 81 in FIG. 4 outputting the high signal rst, the OR element 125 outputs the high signal rst2.

Accordingly, only when the state of the load 11 being an overload continues for the predetermined time period T1, the high signal set2 is outputted, and this prevents frequent repetition of stopping and resuming the switching of the power transistor 30.

Meanwhile, when the level of the voltage Vcs upon turning off of the power transistor 30 is lower than the predetermined level Vref_olp, the detection circuit 110 outputs the low signal set2.

Here, a description will be given of the reason why the detection circuit 110 can detect whether the state of the load 11 is an overload. When the state of the load 11 becomes an overload, the output voltage Vout drops. Thus, the control IC 32 extends the ON period of the power transistor 30. As a result, the inductor current IL1 increases (i.e., the voltage Vcs rises), and the electric power supplied from the primary side to the secondary side of the transformer 22 increases.

This results in a rise in the output voltage Vout, and the output voltage Vout is maintained at the target level Vout_target. As such, in the constant voltage mode, the control IC 32 operates so as to maintain the output voltage Vout at the target level Vout_target, and thus the detection circuit 110 can detect whether the state of the load 11 is an overload by detecting the voltage Vcs.

Then, in response to the time period P0 continuing for the predetermined time period T1, and the predetermined time period T2, which is longer than the predetermined time period T1, having elapsed since the start of the time period P0, the detection circuit 110 outputs the high signal rst2.

In other words, in response to the time period P0 reaching the predetermined time period T2 after the time period P0 reaches the predetermined time period T1, the detection circuit 110 causes the SR flip-flop 95 to reset the high signal olp_o so as to resume switching of the power transistor 30.

===Detection Circuit 111===

In response to the power supply voltage Vcc dropping lower than the predetermined level Vclph before the time period P0 reaches the predetermined time period T1, the detection circuit 111 outputs the high signal sett, so as to cause the SR flip-flop 95 to output the high signal olp_o. The detection circuit 111 includes a hysteresis comparator 130 and an AND element 131.

====Hysteresis Comparator 130====

The hysteresis comparator 130 compares the level of the power supply voltage Vcc with a predetermined level Vclp. Specifically, the hysteresis comparator 130 generates, from the predetermined level Vclp, the predetermined level Vclph and the predetermined level Vclpl, which is lower than the predetermined level Vclph.

Then, when the level of the power supply voltage Vcc is lower than the predetermined level Vclpl, the hysteresis comparator 130 outputs a high signal indicating a drop in the power supply voltage Vcc. Meanwhile, when the level of the power supply voltage Vcc is higher than the predetermined level Vclph, the hysteresis comparator 130 outputs a low signal.

====AND Element 131====

In response to the D flip-flop 121 outputting a high signal indicating the start of the time period P0, and the hysteresis comparator 130 outputting a high signal, the AND element 131 outputs the high signal set1. In this case, the switching control circuit 88 in FIG. 4 stops switching of the power transistor 30 in response to the signal set1.

Here, a description will be given of the reason why the detection circuit 111 can detect whether the state of the load 11 is an overload. When operating in the constant voltage mode, the AC-DC converter 10 operates so as to maintain the output voltage Vout at the target level Vout_target, and thus the detection circuit 110 can detect whether the state of the load 11 is an overload based on the voltage Vcs, as described above.

Meanwhile, there is a case where although the voltage Vcs indicates that the state of the load 11 is an overload, the output voltage Vout cannot be raised by the switching of the power transistor 30. In such a case, the power supply voltage Vcc generated according to the output voltage Vout also drops.

Accordingly, in this case, there is a possibility that the power supply voltage Vcc may have dropped because the state of the load 11 is a more serious overload than the overload in the case where the detection circuit 110 detects that the state of the load 11 is an overload. Thus, unlike the detection circuit 110, the detection circuit 111 can detect that the state of the load 11 is an overload, based on a drop in the power supply voltage Vcc before the time period P0 reaches the predetermined time period T1.

As has been described above, in response to the time period P0 continuing for the predetermined time period T1, the overload protection circuit 86 outputs the high signal set2 indicating an overload. In addition, in response to the predetermined time period T2 having elapsed since the state of the load 11 has become an overload, the overload protection circuit 86 outputs the high signal rst2 to reset the high signal olp_o.

In response to the power supply voltage Vcc dropping lower than the predetermined level Vclp before the time period P0 continues for the predetermined time period T1, the overload protection circuit 86 outputs the high signal set2.

Note that the detection circuit 111 corresponds to a "fourth detection circuit", the predetermined level Vref_olp corresponds to a "fifth voltage", the predetermined level Vclpl corresponds to a "sixth voltage", and the signal set1 corresponds to a "fourth detection signal".

<<<Overload Protection Circuit 86 when AC-DC Converter 10 Operates in Constant Current Mode>>>

A description has been given of the overload protection circuit 86 as above. The overload protection circuit 86 can detect that the state of the load 11 is an overload based on the voltage Vcs, when the AC-DC converter 10 operates in the constant voltage mode.

However, when the AC-DC converter 10 operates in the constant current mode, whether the state of the load 11 is an overload is determined with reference to the load current Iout. When the state of the load 11 becomes an overload and the load current Iout increases larger than the predetermined value Iout_limit, the control IC 32 lowers the output voltage Vout by reducing the ON period of the power transistor 30 and decreasing the switching frequency.

Reduction in the ON period of the power transistor 30 causes the level of the voltage Vcs, which increases at a predetermined slope during the ON period, not to reach the predetermined level Vref_olp.

Accordingly, when the AC-DC converter 10 operates in the constant current mode, the overload protection circuit 86 cannot detect that the state of the load 11 is an overload.

Thus, the control IC 32 according to an embodiment of the present disclosure includes the overload protection circuit 87. When the AC-DC converter 10 operates in the constant current mode, the overload protection circuit 87 can detect whether the state of the load 11 is an overload, based on the power supply voltage Vcc.

==Overload Protection Circuit (OLP) 87==

The overload protection circuit 87 detects whether the state of the load 11 is an overload when the AC-DC converter 10 is operating in the constant current mode. Specifically, in the constant current mode, the overload protection circuit 87 detects the state of the load 11, based on the power supply voltage Vcc.

The overload protection circuit 87, as illustrated in FIG. 11, includes detection circuits 140 and 142 and an output circuit 141.

===Detection Circuit 140===

The detection circuit 140 detects an overload by detecting a drop in the power supply voltage Vcc when the power transistor 30 is switched. Specifically, when the comparator 85 in FIG. 4 outputs the high signal Stop, and the time period P1 during which the level of the power supply voltage Vcc is lower than a predetermined level Vbmh reaches a predetermined time period Ta, the detection circuit 140 outputs a high signal set10 indicating an overload.

This causes the high signal set10 not to be outputted until the state in which the power supply voltage Vcc has dropped continues for the predetermined time period Ta. Thus, the detection circuit 140 can delay the start of the operation when it is detected that the state of the load 11 is an overload.

The following describes the reason why it is possible to detect whether the state of the load 11 is an overload by detecting a drop in the power supply voltage Vcc when the power transistor 30 is switched.

In the constant current mode of the AC-DC converter 10 in FIG. 1, when the state of the load 11 becomes an overload, in other words, when the load current Iout increases, the voltage generated across the secondary coil L2 drops even though the power transistor 30 is being switched.

In association with the drop in the voltage of the secondary coil, the voltage generated across the auxiliary coil L3 magnetically coupled to the secondary coil also drops. In response to the drop in the voltage generated across the auxiliary coil L3, the power supply voltage Vcc also drops. Thus, it is possible to detect whether the state of the load 11 is an overload by detecting a drop in the power supply voltage Vcc when the power transistor 30 is switched.

The detection circuit 140 includes a comparator 150, an inverter 151, an OR element 152, and a timer 153.

====Comparator 150, Inverter 151, OR Element 152====

The comparator 150 compares the level of the power supply voltage Vcc with the predetermined level Vbmh. Specifically, when the level of the power supply voltage Vcc is higher than the predetermined level Vbmh, the comparator 150 causes the OR element 152 to output a high signal rst10 to reset the timer 153. In response to the low signal Stop being inputted to the inverter 151, the OR element 152 outputs the high signal rst10.

In response to the high signal Stop being inputted to the inverter 151, and the level of the power supply voltage Vcc being lower than the predetermined level Vbmh, the OR element 152 outputs the low signal rst10. Note that the comparator 150 corresponds to a "first comparison circuit".

====Timer 153====

The timer 153 performs time measurement to determine whether the time period P1 during which the level of the power supply voltage Vcc is lower than the predetermined level Vbmh has reached the predetermined time period Ta, based on the comparison result of the comparator 150 when the power transistor 30 is switched. Specifically, upon receipt of the low signal rst10, the timer 153 starts time measurement of the predetermined time period Ta. In response to the predetermined time period Ta having elapsed since the release of the reset, the timer 153 outputs the high signal set10 to the output circuit 141.

Upon receipt of the high signal rst10, the timer 153 stops time measurement of the predetermined time period Ta and is reset. Note that the timer 153 corresponds to a "first timer circuit". The detection circuit 140 corresponds to a "first detection circuit", the predetermined level Vbmh corresponds to a "first voltage", the predetermined time period Ta corresponds to a "first time period", and the signal set10 corresponds to a "first detection signal".

===Output Circuit 141===

The output circuit 141 outputs the high signal set13 in response to the signals from the detection circuits 140 and 142. Specifically, the output circuit 141 outputs the high signal set13, in response to the signal rst10 from the OR element 152, the signal set10 from the timer 153, and a signal set11 from the detection circuit 142 (described later).

The output circuit 141 includes an OR element 160 and an SR flip-flop 161. The OR element 160 outputs a high signal set12 indicating an overload, in response to the high signal set10 from the detection circuit 140 and the high signal set11 indicating an overload from the detection circuit 142.

The SR flip-flop 161 outputs the high signal set13 in response to the high signal set12 from the OR element 160. Meanwhile, the SR flip-flop 161 resets the high signal set13 in response to the high signal rst10 from the OR element 152.

===Detection Circuit 142===

In response to further drop in the power supply voltage Vcc while the power transistor 30 is being switched, the detection circuit 142 outputs the high signal set11 indicating an overload. Specifically, in response to the level of the power supply voltage Vcc reaching the predetermined level Vbml lower than the predetermined level Vbmh while the power transistor 30 is being switched, the detection circuit 142 outputs the high signal set11.

Meanwhile, in response to the comparator 85 in FIG. 4 causing the buffer 96 to stop switching, or the level of the power supply voltage Vcc exceeding the predetermined level Vbml, the detection circuit 142 outputs the low signal set11.

The detection circuit 142 includes a comparator 170 and a NOR element 171. The comparator 170 compares the level of the power supply voltage Vcc with the predetermined level Vbml. When the comparator 85 outputs the high signal Stop, and the comparator 170 indicates that the level of the power supply voltage Vcc is lower than the predetermined level Vbml, the NOR element 171 outputs the high signal set11.

When the comparator 85 outputs the low signal Stop, or comparator 170 indicates that the level of the power supply voltage Vcc is higher than the predetermined level Vbml, the NOR element 171 outputs the low signal set11.

Note that the predetermined level Vbml is higher than the predetermined level Voff at which the undervoltage lockout circuit 81 outputs the high signal rst. Accordingly, the detection circuit 142 detects that the state of the load 11 is an overload before the undervoltage lockout circuit 81 outputs the high signal rst. Thus, the detection circuit 142 can prevent such a situation in which the state of the load 11 becomes an overload, causing a drop in the power supply voltage Vcc, to thereby operate the undervoltage lockout circuit 81.

Note that the overload protection circuit 87 corresponds to a "first overload protection circuit", the detection circuit 142 corresponds to a "second detection circuit", the predetermined level Vbml corresponds to a "second voltage", and the signal set11 corresponds to a "second detection signal".

<<<Operation of Overload Protection Circuit 87>>>

First, with reference to FIG. 12, a description will be given of a case where the SR flip-flop 95 outputs the high signal olp_o, in response to the timer 153 outputting the high signal set10. Note that a description will be given of the operation of the overload protection circuit 87 with reference to FIG. 12, assuming that the AC-DC converter 10 is operating in the constant current mode.

It is assumed that the load current Iout increases and the feedback voltage Vfb drops before time t20. This decreases the ON period of the power transistor 30 and the switching frequency of the power transistor 30. Thus, in association with a drop in the output voltage Vout, the voltage generated across the auxiliary coil L3 also drops, and the power supply voltage Vcc also drops.

At time t20 at which the level of the power supply voltage Vcc drops lower than the predetermined level Vbmh, the OR element 152 outputs the low signal rst10.

At time t21 at which the predetermined time period Ta has elapsed since time t20, the timer 153 outputs the high signal set10. Then, the output circuit 141 outputs the high signal set13. Thus, the SR flip-flop 95 outputs the high signal olp_o.

Thereafter, the startup control circuit 82 in FIG. 4 controls the startup circuit 80 such that the level of the power supply voltage Vcc is maintained between the predetermined level Vclph and the predetermined level Vclpl, in response to the high signal olp_o. Since the SR flip-flop 95 outputs the high signal olp_o, the PMOS transistor 83 is turned off, and the feedback voltage Vfb reaches the ground voltage.

Then, at time t22 at which the level of the power supply voltage Vcc exceeds the predetermined level Vbmh, the OR element 152 outputs the high signal rst10. This causes the output circuit 141 to reset the high signal set13.

As above, a description has been given of a case where the SR flip-flop 95 outputs the high signal olp_o, in response to the timer 153 outputting the high signal set10. In this case, in response to the time period during which the level of the power supply voltage Vcc is lower than the predetermined level Vbmh reaching the predetermined time period Ta while the power transistor 30 is being switched, the overload protection circuit 87 outputs the high signal set13.

With the overload protection circuit 87 operating as such, the AC-DC converter 10 can extend, using the predetermined time period Ta, the cycle of detecting an overload in the constant current mode and shifting to the constant voltage mode, and then shifting to the constant current mode again and detecting an overload.

This extends the cycle of from the startup, through the constant voltage mode and the constant current mode, until detection of an overload, resulting the average electric power inputted to the AC-DC converter 10 can be reduced.

Next, with reference to FIG. 13, a description will be given of a case where the detection circuit 142 outputs the signal set11 indicating an overload, to thereby cause the SR flip-flop 95 to output the signal olp_o indicating an overload. Note that, as in FIG. 12, the operation of the overload protection circuit 87 will be described with reference to FIG. 13 assuming that the AC-DC converter 10 is operating in the constant current mode.

Figure 12:
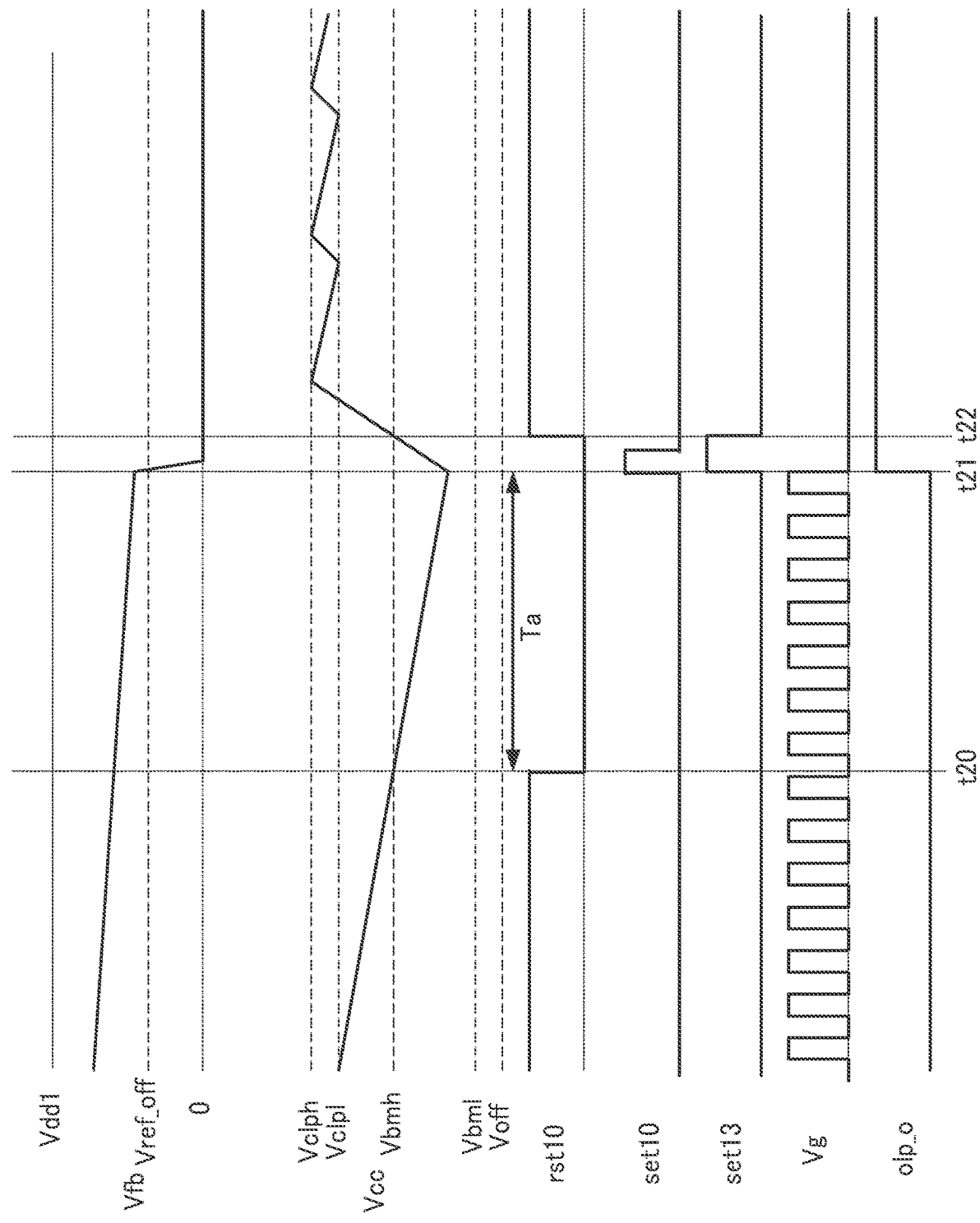
FIG. 12 is a diagram illustrating an example of a timing chart indicating an operation of an overload protection circuit 87.
Figure 13:
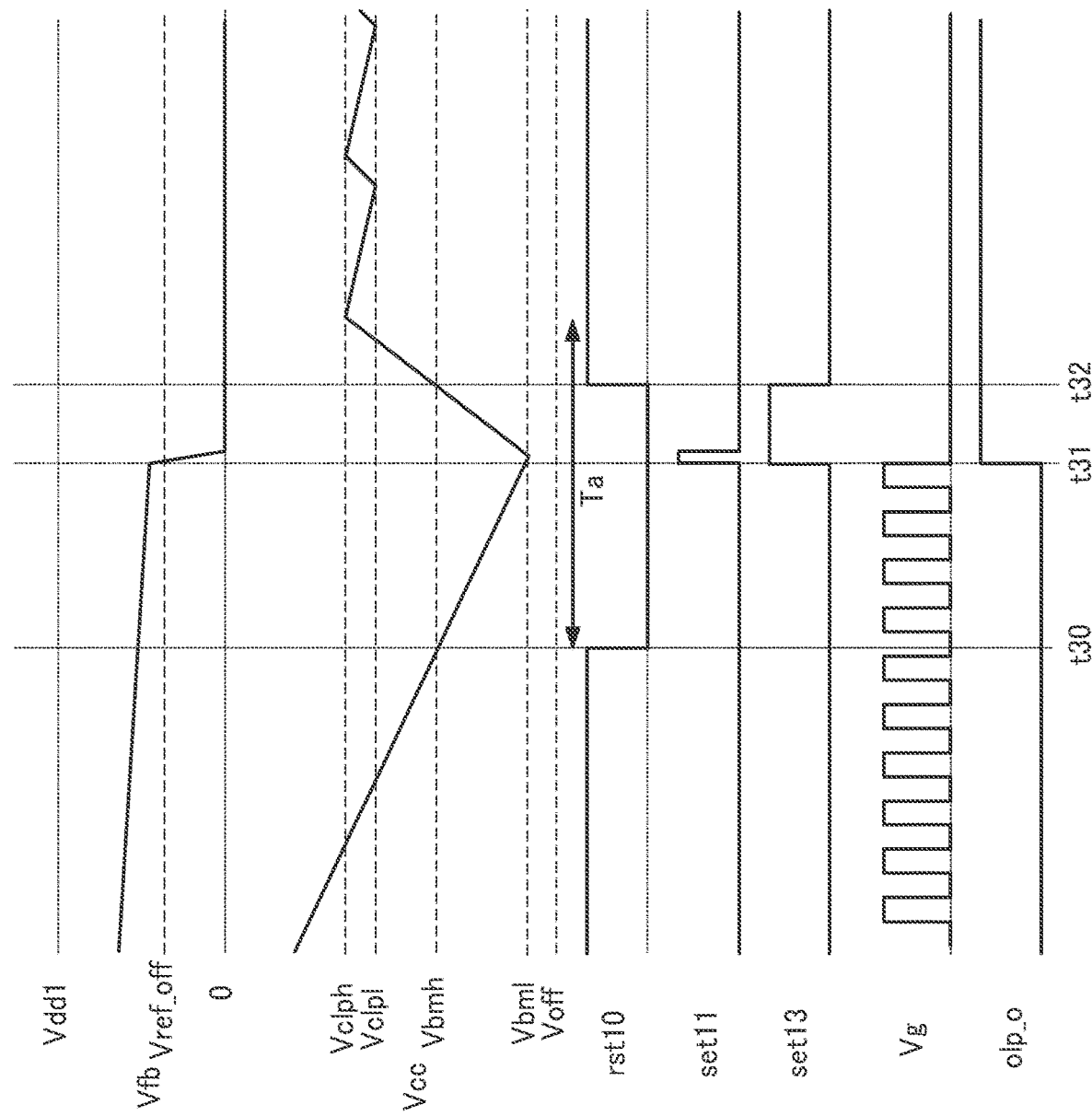
FIG. 13 is a diagram illustrating an example of a timing chart indicating an operation of an overload protection circuit 87.

The state before time t30 is the same as or similar to the state before time t20 in FIG. 12. Hence, the reason why the power supply voltage Vcc drops before time t30 is the same as or similar to the case in FIG. 12. It is assumed here that the rate of a drop in the power supply voltage Vcc per unit time in FIG. 13 is higher than in the case of FIG. 12.

At time t31 at which the level of the power supply voltage Vcc drops lower than the predetermined level Vbml, the detection circuit 142 outputs the high signal set11. Then, the output circuit 141 outputs the high signal set13. The SR flip-flop 95 outputs the high signal olp_o. Note that the operation at and after time t32 is the same as or similar to the operation at and after time t22 in FIG. 12.

As above, a description has been given of a case where the detection circuit 142 outputs the high signal set11, to thereby cause the SR flip-flop 95 to output the high signal olp_o. In this case, in response to the level of the power supply voltage Vcc dropping lower than the predetermined level Vbml while the power transistor 30 is being switched, the overload protection circuit 87 immediately outputs the high signal set13.

Since the overload protection circuit 87 operates as such, the overload protection circuit 87 can detect an overload when the power supply voltage Vcc is at a level higher than the predetermined level Voff. Note that the predetermined level Voff is the level of the power supply voltage Vcc at which the undervoltage lockout circuit 81 outputs the high signal rst.

This makes it possible that the overload protection circuit 87 can detect an overload without being reset by the undervoltage lockout circuit 81, even if the state of the load 11 becomes an overload while the AC-DC converter 10 is in the constant current mode.

Modification Example

In an embodiment described above, in response to the timer 123 in FIG. 10 having measured the predetermined time period T2, the SR flip-flop 95 resets the high signal olp_o (i.e., automatically restored). Alternatively, after the SR flip-flop 95 outputs the high signal olp_o, the SR flip-flop 95 may reset the high signal olp_o by disconnecting the AC-DC converter 10 of FIG. 1 from the AC voltage Vac.

Figure 14:
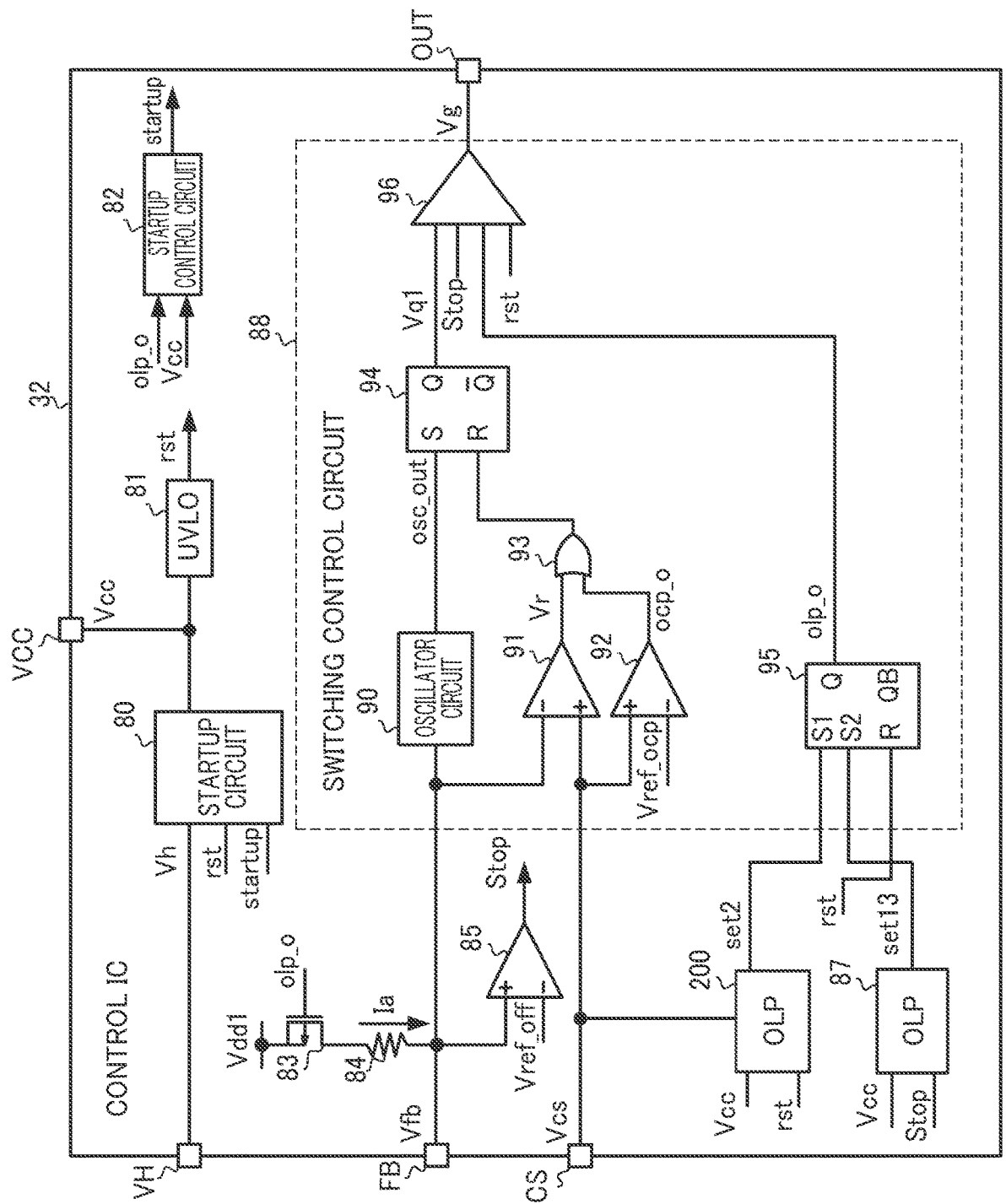
FIG. 14 is a diagram illustrating an example of the configuration of a modified example of a control IC 32.

Specifically, as illustrated in FIG. 14, the SR flip-flop 95 is configured to be reset in response to the high signal rst from the undervoltage lockout circuit 81. In this case, in response to the AC voltage Vac being disconnected from the AC-DC converter 10, the power supply voltage Vcc drops. This causes the undervoltage lockout circuit 81 to output the high signal rst.

Accordingly, in response to the AC voltage Vac being disconnected from the AC-DC converter 10, the SR flip-flop 95 resets the high signal olp_o. Note that, in FIGS. 4 and 14, the same constituents are given the same reference symbols.

Figure 15:
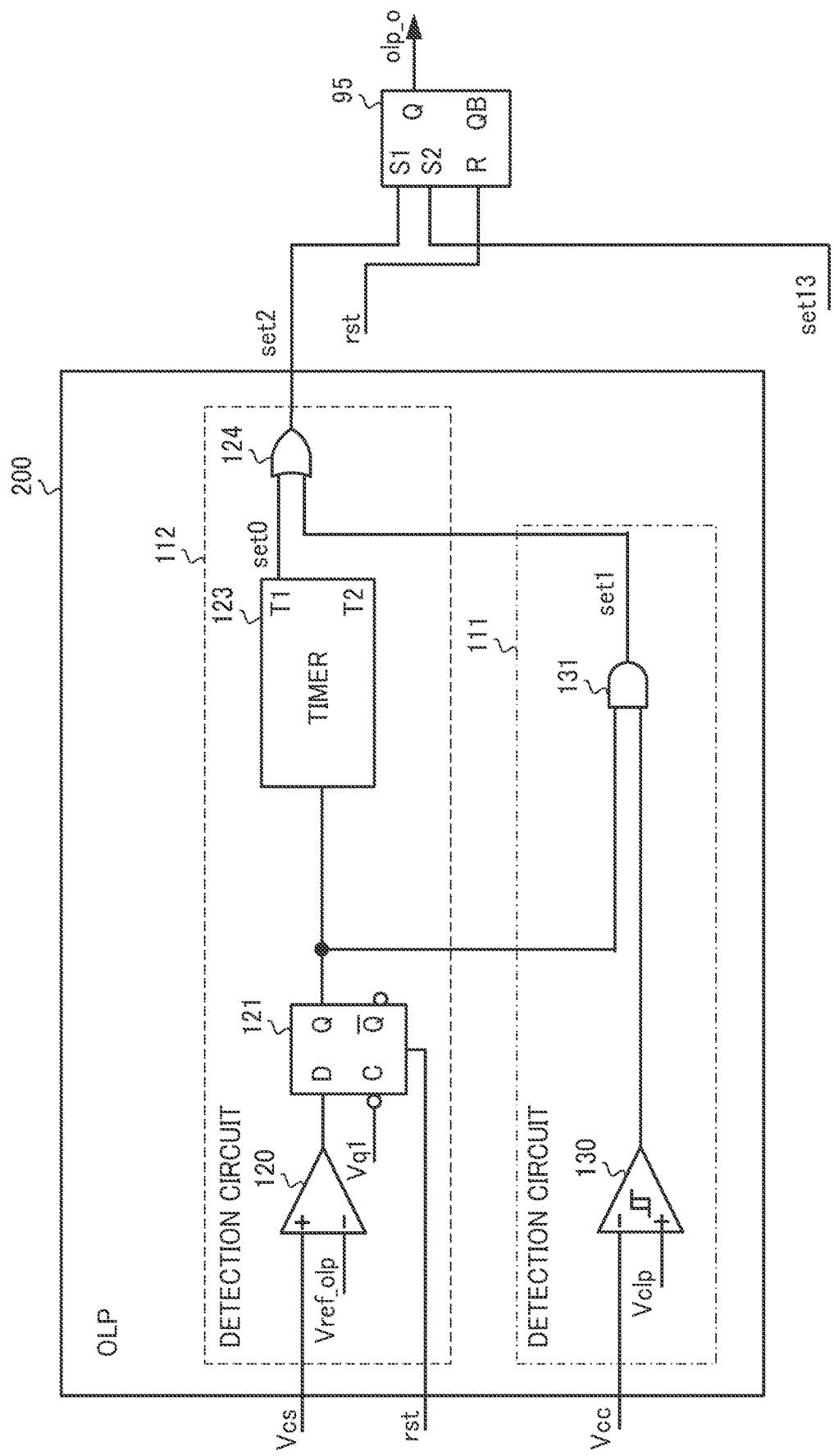
FIG. 15 is a diagram illustrating an example of the configuration of an overload protection circuit 200.

In this case, since the AC-DC converter 10 is not automatically restored, the overload protection circuit 200 which is a modification example of the overload protection circuit 86 does not output the signal rst2, as illustrated in FIG. 15. In addition, since the timer 123 does not need to measure the predetermined time period T2 based on the signal olp_o, either, the signal olp_o is not inputted to the overload protection circuit 200. Note that in FIGS. 10 and 15, the same constituents are given the same reference symbols.

SUMMARY

As above, a description has been given of the AC-DC converter 10 according to an embodiment of the present disclosure. The AC-DC converter 10 includes the transformer 22, the power transistor 30, the control IC 32, the control circuit 42, and the phototransistor 38. The control IC 32 includes the comparator 85, the overload protection circuit 87, and the switching control circuit 88. This makes it possible for the AC-DC converter 10 to detect that the state of the load 11 is an overload, even if the output voltage Vout drops due to the droop characteristic. In other words, it is possible to provide a power supply circuit that has a droop characteristic in the output voltage and is capable of detecting whether the state of the load is an overload.

The overload protection circuit 87 includes the detection circuit 140. This makes it possible for the AC-DC converter 10 to extend, using the predetermined time period Ta, the cycle of detecting an overload in the constant current mode and shifting to the constant voltage mode, and then shifting to the constant current mode again and detecting an overload.

The detection circuit 140 includes the comparator 150 and the timer 153. This makes it possible to extend the cycle of detecting whether the state of the load 11 is an overload, longer than the predetermined time period Ta, with the simple circuit.

The overload protection circuit 87 includes the detection circuit 142. This makes it possible for the AC-DC converter 10 to immediately stop switching of the power transistor 30 when the power supply voltage Vcc further drops before the time period P1 reaches the predetermined time period Ta.

The overload protection circuit 86 includes the timer 123. This makes it possible for the AC-DC converter 10 to be automatically restored from the state in which an overload is detected, in response to the predetermined time period T2 having elapsed since the state of the load 11 has become an overload.

The control IC 32 includes the undervoltage lockout circuit 81. This makes it possible for the AC-DC converter 10 to detect that the state of the load 11 is an overload before the level of the power supply voltage Vcc reaches the predetermined level Voff, and even if detecting an overload, the AC-DC converter 10 can operate without the control IC 32 being reset by the undervoltage lockout circuit 81. In addition, it is possible to prevent or reduce an increase in the average electric power consumed by the AC-DC converter 10 caused by repetition of startup operations.

The control IC 32 includes the startup circuit 80. This makes it possible for the AC-DC converter 10 to keep operating without the undervoltage lockout circuit 81 being operated even if it is detected that the state of the load 11 is an overload.

The control IC 32 includes the overload protection circuit 86. This makes it possible for the AC-DC converter 10 to detect whether the state of the load 11 is an overload, even when operating in the constant voltage mode.

The overload protection circuit 86 includes the detection circuit 110. This makes it possible for the AC-DC converter 10 to detect whether the state of the load 11 is an overload, based on whether the time period during which the inductor current flowing through the power transistor 30 is large continues for the predetermined time period T1, even when operating in the constant voltage mode.

The overload protection circuit 87 includes the detection circuit 142. This makes it possible for the AC-DC converter 10 to detect that the state of the load 11 is an overload, in response to the power supply voltage dropping when the inductor current flowing through the power transistor 30 is large.

The control IC 32 includes the timer 123. This makes it possible for the AC-DC converter 10 to be automatically restored from the state in which an overload is detected, in response to the predetermined time period T2 having elapsed since the state of the load 11 has become an overload.

The present disclosure is directed to provision of a power supply circuit that has a droop characteristic in the output voltage and is capable of detecting whether the state of the load is an overload.

According to the present disclosure, it is possible to provide a power supply circuit that has a droop characteristic in the output voltage and is capable of detecting whether the state of the load is an overload.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A power supply circuit configured to generate, for a load, an output voltage at a target level from an input voltage thereof, the power supply circuit comprising:
   a transformer including a primary coil, a secondary coil, and an auxiliary coil;
   a transistor configured to control an inductor current flowing through the primary coil;
   an integrated circuit having
      a first terminal configured to receive a power supply voltage based on a voltage across the auxiliary coil, and
      a second terminal configured to receive a feedback voltage,
   the integrated circuit being configured to switch the transistor, based on the feedback voltage; and
   a feedback circuit configured to,
      responsive to a load current flowing through the load being smaller than a predetermined value, generate the feedback voltage to cause the output voltage to reach the target level, and
      responsive to the load current being larger than the predetermined value, generate the feedback voltage to lower the output voltage, wherein
   the integrated circuit further includes
      a determination circuit configured to determine whether the transistor operates in a first mode in which the transistor is switched or a second mode in which switching of the transistor is stopped, based on the feedback voltage,
      a first overload protection circuit configured to detect whether the load is in an overload state, based on the power supply voltage and a determination result of the determination circuit at a time when the determination result indicates that the transistor operates in the first mode, and
      a switching control circuit configured to control the switching of the transistor, based on the feedback voltage, a determination result of the determination circuit, and a detection result of the first overload protection circuit, the switching control circuit stopping the switching of the transistor, in response to the first overload protection circuit detecting that the load is in the overload state.

2. The power supply circuit according to claim 1, wherein the first overload protection circuit includes a first detection circuit configured to output a first detection signal indicating that the load is in the overload state, in response to a time period, during which the power supply voltage is lower than a first voltage, reaching a first time period, when the determination result indicates that the transistor operates in the first mode.

3. The power supply circuit according to claim 2, wherein the first detection circuit includes
a first comparison circuit configured to compare the power supply voltage with the first voltage, and
a first timer circuit configured to measure the time period during which the power supply voltage is lower than the first voltage, based on a comparison result of the first comparison circuit, when the determination result indicates that the transistor operates in the first mode.

4. The power supply circuit according to claim 2, wherein the first overload protection circuit further includes a second detection circuit configured to output a second detection signal indicating that the load is in the overload state, in response to the power supply voltage reaching a second voltage lower than the first voltage, when the determination result indicates that the transistor operates in the first mode, and
the switching control circuit stops the switching of the transistor in response to the second detection signal.

5. The power supply circuit according to claim 4, wherein the integrated circuit further includes a second timer circuit configured to measure a second time period, in response to the first detection signal or the second detection signal, and
the switching control circuit controls the switching of the transistor, based on the feedback voltage and the determination result, in response to the second timer circuit having measured the second time period.

6. The power supply circuit according to claim 4, wherein the integrated circuit further includes a protection circuit configured to
output a stop signal to stop the switching of the transistor, in response to the power supply voltage reaching a third voltage lower than the second voltage, and
output an enabling signal to enable the switching of the transistor, in response to the power supply voltage reaching a fourth voltage higher than the third voltage, and the switching control circuit is configured to
stop the switching of the transistor, in response to the stop signal being outputted, and
control the switching of the transistor based on the feedback voltage and the determination result, in response to the enabling signal being outputted.

7. The power supply circuit according to claim 6, wherein the first terminal is configured to have a capacitor coupled thereto, the capacitor being configured to receive the power supply voltage, and
the integrated circuit further includes a charge circuit configured to charge the capacitor in response to the first detection signal or the second detection signal being outputted.

8. The power supply circuit according to claim 1, wherein the integrated circuit further includes
a third terminal configured to receive another voltage that corresponds to the inductor current, and
a second overload protection circuit configured to detect whether the load is in the overload state, based on said another voltage at the third terminal; and
the switching control circuit stops the switching of the transistor, based on a detection result received from the second overload protection circuit indicating that the load is in the overload state.

9. The power supply circuit according to claim 8, wherein the second overload protection circuit includes a third detection circuit configured to output a third detection signal indicating whether the load is in the overload state, based on whether a time period, during which the voltage at the third terminal is higher than a fifth voltage, continues for a third time period.

10. The power supply circuit according to claim 9, wherein
the second overload protection circuit further includes a fourth detection circuit configured to output a fourth detection signal indicating that the load is in the overload state, in response to said another voltage at the third terminal being higher than the fifth voltage and the power supply voltage being lower than a sixth voltage, upon turning-off of the transistor, and
the switching control circuit stops the switching of the transistor in response to the fourth detection signal.

11. The power supply circuit according to claim 10, wherein
The integrated circuit further includes a third timer circuit configured to measure a fourth time period in response to the third detection signal or the fourth detection signal, and
the switching control circuit controls the switching of the transistor, based on the feedback voltage and the determination result, in response to the third timer circuit having measured the fourth time period.

* * * * *